United States Patent
Legg et al.

(10) Patent No.: US 10,476,644 B2
(45) Date of Patent: Nov. 12, 2019

(54) METHOD AND APPARATUS FOR ALLOCATING SOUNDING RESOURCES IN A WIRELESS NETWORK

(71) Applicant: Huawei Technologies Co., Ltd., Shenzhen, Guangdong (CN)

(72) Inventors: Peter Legg, Kista (SE); Damian Kolmas, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/831,216

(22) Filed: Dec. 4, 2017

(65) Prior Publication Data

US 2018/0097597 A1 Apr. 5, 2018

Related U.S. Application Data

(63) Continuation of application No. PCT/EP2015/062581, filed on Jun. 5, 2015.

(51) Int. Cl.
*H04L 5/00* (2006.01)
*H04W 72/04* (2009.01)
*H04W 72/12* (2009.01)

(52) U.S. Cl.
CPC ......... *H04L 5/0048* (2013.01); *H04L 5/0051* (2013.01); *H04W 72/042* (2013.01); *H04W 72/1247* (2013.01); *H04W 72/1257* (2013.01); *H04W 72/0446* (2013.01)

(58) Field of Classification Search
None
See application file for complete search history.

(56) References Cited

U.S. PATENT DOCUMENTS

| 9,872,259 B2* | 1/2018 | Park ............... H04W 52/325 |
| 2007/0232318 A1* | 10/2007 | Nobukiyo ......... H04W 52/16 455/450 |
| 2008/0233967 A1 | 9/2008 | Montojo et al. |
| 2009/0274224 A1 | 11/2009 | Harris |
| 2012/0039273 A1* | 2/2012 | Nam ................ H04L 5/0005 370/329 |

(Continued)

FOREIGN PATENT DOCUMENTS

| CN | 102291770 A | 12/2011 |
| CN | 103095442 A | 5/2013 |

(Continued)

OTHER PUBLICATIONS

Zhou et al.; "A Novel CQI-Assisted Sounding Design for TDD LTE-Advanced System"; IEEE ICC 2012—Wireless Networks Symposium; Ottawa, Canada, Jun. 2012; 5 pages.

*Primary Examiner* — Kodzovi Acolatse
(74) *Attorney, Agent, or Firm* — Huawei Technologies Co., Ltd.

(57) ABSTRACT

A computing apparatus for allocating sounding resources in an access node of a wireless network. The computing apparatus comprises a processor configured to determine a first device state based on a device state model and first device information, wherein the first device state model includes a finite number of states. The processor is configured to determine a first target sounding configuration for the first device information based on the first device state, and output the first target sounding configuration.

17 Claims, 17 Drawing Sheets

(56) References Cited

U.S. PATENT DOCUMENTS

| | | | |
|---|---|---|---|
| 2012/0281566 A1* | 11/2012 | Pelletier | H04W 76/27 370/252 |
| 2013/0005382 A1 | 1/2013 | Landstrom et al. | |
| 2013/0089058 A1 | 4/2013 | Yang et al. | |
| 2013/0150007 A1* | 6/2013 | Wang | H04W 4/18 455/414.1 |
| 2013/0163493 A1* | 6/2013 | Manepalli | H04W 52/0251 370/311 |
| 2013/0242911 A1* | 9/2013 | Heo | H04L 5/001 370/329 |
| 2013/0250893 A1* | 9/2013 | Li | H04W 24/10 370/329 |
| 2014/0133447 A1* | 5/2014 | Moulsley | H04W 72/1278 370/329 |
| 2014/0211735 A1* | 7/2014 | Nanri | H04W 24/08 370/329 |
| 2014/0241242 A1 | 8/2014 | Josiam et al. | |
| 2015/0222402 A1* | 8/2015 | Ouchi | H04L 1/00 370/329 |
| 2017/0265212 A1* | 9/2017 | Zhang | H04L 5/0048 |

FOREIGN PATENT DOCUMENTS

| | | |
|---|---|---|
| CN | 103825663 A | 5/2014 |
| EP | 1761097 A2 | 3/2007 |
| WO | 2007082141 A2 | 7/2007 |
| WO | 2008098223 A2 | 8/2008 |
| WO | 2011053204 A1 | 5/2011 |
| WO | 2014050584 A1 | 4/2014 |
| WO | 2014051478 A1 | 4/2014 |
| WO | 2016034194 A1 | 3/2016 |

\* cited by examiner

METHOD AND APPARATUS FOR ALLOCATING SOUNDING RESOURCES IN A WIRELESS NETWORK

CROSS-REFERENCE TO RELATED APPLICATIONS

This application is a continuation of International Application No. PCT/EP2015/062581, filed on Jun. 5, 2015, the disclosure of which is hereby incorporated by reference in its entirety.

TECHNICAL FIELD

The aspects of the present disclosure relate generally to wireless communication systems and in particular to allocation of sounding reference symbol resources.

BACKGROUND

The increase in the number of mobile devices subscribing to Long Term Evolution (LTE) type wireless communication systems has created high cell loads, both in terms of resource block (RB) utilization (e.g., >75%) and the number of simultaneously connected or on-line devices in a cell. Mobile users are expected to enjoy a wide-range of mobile applications generating diverse types of "smart phone traffic", with a spread of data packet sizes and inter-packet arrival times. These conditions are favorable for achieving large gains through the use of multi-user diversity and frequency selective scheduling (FSS), thereby providing an improved smart phone experience to their users.

When the number of mobile devices in a cell is large, it is not practical to give rich channel state information (CSI) signaling to every on-line mobile device to achieve good FSS. Rich CSI signaling means detailed sub-band CSI across the entire carrier bandwidth with a relatively short update period. This can result in large signaling overhead, and may exhaust all available sounding reference symbol (SRS) resources due to repeated transmission of SRS on each sub-band by all on-line mobile devices. High cell loads make it difficult to manage SRS transmission and allocate sounding resources to mobile devices in a way that maximizes important performance metrics such as cell uplink throughput or uplink throughput of mobile devices located near the edge of a cell. Rich CSI is essential for accurate FSS. Knowledge of the frequency response across the whole bandwidth allows identification of the best frequency bands for each mobile device.

Frequency specific CSI should remain accurate across multiple scheduling periods, such as 1 millisecond in LTE, before it is refreshed with another sounding. Frequent CSI measurement is necessary even for slow moving mobile devices. For example, sounding the whole band every 20 ms (with individual sub-band sounding transmissions every 5 ms) is recommended for pedestrian users moving at about 3 km/h. For higher mobile user speeds, the reporting interval should drop in inverse proportion to the speed. Rich sounding comes at a cost. For example, in some conventional networks every sub-frame may be configured to use one SC-FDMA symbol as a SRS, resulting in a sounding overhead of $\frac{1}{12}$th or about 8%. It is therefore desirable to configure a mobile device for rich sounding only when necessary. The sounding configuration, or SRS reporting configuration, of a mobile device may be changed through the use of a radio resource control (RRC) connection reconfiguration procedure. While, the resource block cost of a RRC connection reconfiguration is low, it does consume a number of physical downlink control channel (PDCCH) resources. There is also a risk of encountering a radio link failure and dropping a call when a mobile device is encountering poor radio conditions such as when the mobile device is at the edge of a cell. Because of this, it is recommended to keep the RRC connection reconfigurations low, such as less than one hertz per mobile device.

Thus, there is a need for methods and apparatus for assigning sounding resources to mobile devices that effectively maximize desired performance criteria, such as throughput of cell edge users, while at the same time keeping RRC connection reconfigurations to a minimum.

SUMMARY

It is an object of the present disclosure to provide apparatus and methods that can allocate sounding resources in a radio access network such that mobile devices likely to achieve the greatest throughput improvements receive the richest sounding configurations without excessive radio resource control reconfigurations.

According to a first aspect of the present disclosure the above and further objects and advantages are obtained by a computing apparatus for use in an access node. The computing apparatus includes a processor configured to determine a first device state based on a device state model and first device information, wherein the device state model comprises a finite number of states. The processor then determines a first target sounding configuration for the first device information based on the first device state and outputs the first target sounding configuration. In this manner, richer sounding configurations are provided without excessive radio resource control reconfigurations.

In a first possible implementation form of the computing apparatus according to the first aspect the processor is configured to determine the first device state based on an amount of data in a transmit buffer. This allows for richer sounding configurations to be provided to mobile devices requiring transmission of larger amounts of data.

In a second possible implementation form of the computing apparatus according to the first aspect as such or to the first possible implementation form of the first aspect the processor is configured to move the first device state to a higher buffer state when the amount of data in the transmit buffer exceeds a first predetermined threshold for a first predetermined period of time, and to move the first device state to a lower buffer state when the amount of data in the transmit buffer drops below a second predetermined threshold for a second predetermined period of time. In this manner, reliable device state determination is achieved.

In a third implementation form of the computing apparatus according to the first aspect the processor is configured to determine the first device state based on an amount of data in the transmit buffer, an amount of data transmitted, and a traffic type. In this manner, improved determination of a device state is achieved.

In a fourth implementation form of the computing apparatus according to the first aspect the processor is configured to determine the first device state based on a current and past quantity of resource blocks in the first device information and/or a current and past frequency of data transmissions in the first device information. This enables improved allocation of sounding resources.

In a fifth implementation form of the computing apparatus according to the first aspect as such or to the fourth implementation form of the first aspect the processor is configured to estimate a device information value for a next time period based on one or more past device information values, and determine the resource block state based on the estimated device information value. This allows for improved allocation of sounding resources to be achieved.

In a sixth possible implementation form of the apparatus according to the first aspect as such or to any of the preceding first through fifth implementation forms of the first aspect the processor is configured to determine a second device state based on the device state model and a second device information, determine a second target sounding configuration, wherein the second target sounding configuration comprises fewer sounding resources than a current sounding configuration of the second device information, and when available sounding resources for a cell are insufficient to support the first target sounding configuration, output the second target sounding configuration to increase the available sounding resources in the cell. This provides for swapping of sounding resources between mobile devices requiring additional sounding resources and mobile devices with excess sounding resources.

In a seventh possible implementation form of the computing apparatus according to the first aspect as such or to any of the preceding first through sixth implementation forms of the first aspect the processor is configured to determine a first priority for the first device information based on the first device state and the first device information, determine a second priority for the second device information based on the second device state and the second device information, assign the first device information to a promotion list when a current sounding configuration of the first device information comprises fewer sounding resources than the first target sounding configuration, and assign the second device information to a demotion list when the current sounding configuration of the second device information comprises more sounding resources than the second target sounding configuration. This enables allocating sounding resources to mobile devices most likely to benefit from rich sounding.

In an eighth implementation form of the computing apparatus according to the first aspect the processor is configured to determine the first priority for the first device based on at least one of a received signal strength, a power headroom, and a location of a mobile device. This allows for rich sounding to be provided to mobile devices near the edge of a cell.

In a ninth implementation form of the computing apparatus according to the first aspect as such or to the seventh or eighth implementation forms of the first aspect the processor is configured to determine the first priority for the first device based on at least one of an amount of transmission resources, an uplink channel condition, and a quality of service of the mobile device. This can improve the allocation of sounding resources.

In a tenth possible implementation form of the computing apparatus according to the first aspect as such or to the first through ninth implementation forms of the first aspect, the processor is configured to determine the first device priority or the second device priority based on a weighted sum of features in the first device information or second device information. This can improve the allocation of sounding resources.

In an eleventh possible implementation form of the computing apparatus according to the first aspect as such or to the seventh through tenth implementation forms of the first aspect the processor is configured to remove the first device information from the promotion list when the first priority comprises a highest priority of the promotion list and output the first target sounding configuration. When there are insufficient sounding resources available in a cell to support the first target sounding configuration the processor is configured to remove the second device information from the demotion list when the second priority comprises a lowest priority of the demotion list, and output the second target sounding configuration. This can enable additional sounding resources to be obtained.

In a twelfth possible implementation form of the computing apparatus according to the first aspect as such or to any of the preceding first through eleventh implementation forms of the first aspect the processor is configured to initiate the determination of the target sounding configuration based on a timer. This can provide an improved triggering of sounding resource configuration.

In a thirteenth possible implementation form of the computing apparatus according to the first aspect as such or to any of the previous first through eleventh implementation forms of the first aspect the processor is configured to initiate the determination of the target sounding configuration based on an event, wherein the event comprises a mobile device disconnecting from a cell. This can provide an improved triggering of sounding resources.

According to a second aspect of the present disclosure the above and further objects and advantages are obtained by a method for allocating sounding resources. In one embodiment the method includes determining a first device state based on a device state model and a first device information, wherein the first device state model comprises a finite number of states. The method determines a first target sounding configuration for the first device information based on the first device state and outputs the first target sounding configuration. In this manner, richer sounding configurations are provided without excessive radio resource control reconfigurations.

In a first possible implementation form of the method according to the second aspect the method includes determining a second device state based on the device state model and a second device information, determining a second target sounding configuration, wherein the second target sounding configuration comprises fewer sounding resources than a current sounding configuration of the second device information. When available sounding resources for a cell are insufficient to support the first target sounding configuration, the method outputs the second target sounding configuration to increase the available sounding resources in the cell. This provides for swapping of sounding resources between mobile devices requiring additional sounding resources and mobile devices with excess sounding resources.

In a second possible implementation form of the method according to the second aspect as such or to the first implementation form of the second aspect the method includes determining a first priority for the first device information based on the first device state and the first device information, and determining a second priority for the second device information based on the second device state and the second device information. The method assigns the first device information to a promotion list when a current sounding configuration of the first device information comprises fewer sounding resources than the first target sounding configuration, and assigns the second device information to a demotion list when the current sounding configuration of the second device information comprises more sounding resources than the second target sounding configuration. This enables allocating sounding resources to mobile devices most likely to benefit from rich sounding.

In an third possible implementation form of the method according to the second aspect as such or to the first or second implementation forms of the second aspect the method includes removing the first device information from the promotion list when the first priority comprises a highest priority of the promotion list and outputting the first target sounding configuration. When there are insufficient sounding resources available in a cell to support the first target sounding configuration the method includes removing the second device information from the demotion list when the second priority comprises a lowest priority of the demotion list, and outputting the second target sounding configuration. This enables releasing sounding resources from less active mobile devices to make sounding resources available for use by highly active mobile devices.

According to a third aspect of the present disclosure the above and further aspects and advantages are obtained by a computer program product comprising non-transitory computer program instructions that when executed by a processing apparatus cause the processing apparatus to perform the method according to the second aspect.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed disclosure, for which reference should be made to the appended claims. Additional aspects and advantages of the disclosure will be set forth in the description that follows, and in part will be obvious from the description, or may be learned by practice of the disclosure. Moreover, the aspects and advantages of the disclosure may be realized and obtained by means of the instrumentalities and combinations particularly pointed out in the appended claims.

BRIEF DESCRIPTION OF THE DRAWINGS

In the following, the disclosure will be explained in more detail with reference to the example embodiments shown in the drawings, in which.

DETAILED DESCRIPTION OF THE DISCLOSED EMBODIMENTS

Figure 1:
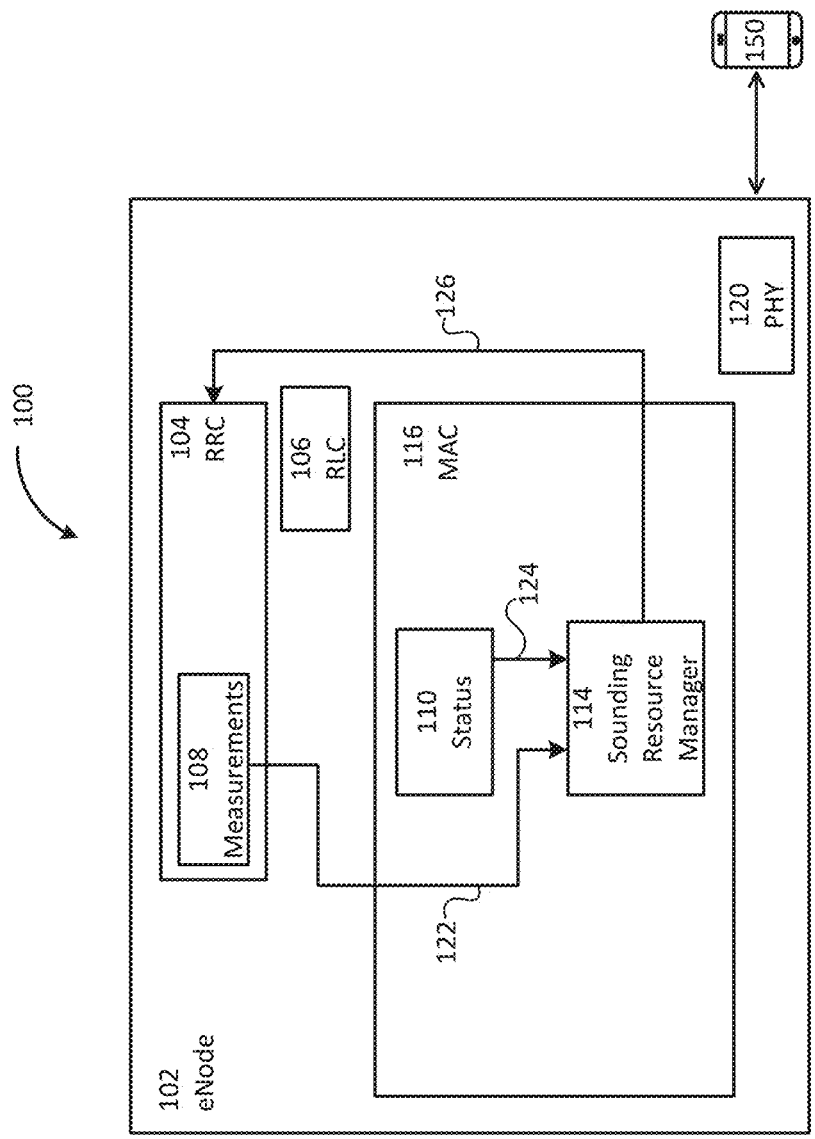
FIG. 1 illustrates a block diagram of an access node configured for adjusting the sounding resources allocated to mobile devices in a cell in accordance with the aspects of the disclosed embodiments.

FIG. 1 illustrates a block diagram of an access node 100 configured to adjust the sounding resources allocated to one or more mobile devices 150 in a cell. The term "cell" as used herein refers to an access node, all radio resource units controlled by the access node, and all mobile devices whose radio transmissions and receptions are coordinated over a common set of radio resources by the access node. The access node 100, which in certain embodiments may be an eNodeB 102, is the element in a wireless communication system that is connected directly to mobile devices 150 via a radio link or air interface. Among other functions, the access node 100 is responsible for configuring sounding reference symbol reporting for each mobile device 150 to maximize uplink performance of the mobile devices 150. The uplink performance may be quantified using various metrics such as transmission delay, data throughput, etc.

In certain embodiments the access node 100 may configure sounding reference symbol reporting or allocate sounding resources to improve the uplink performance of mobile devices 150 based on their location, such as improving uplink performance of mobile devices located near the edge of a cell. Much of the performance improvement achieved by allocation of the sounding resources is achieved through frequency selective scheduling (FSS) made possible by frequency specific channel information.

Effective management of FSS requires an access node (AN) 100 or eNodeB 102 to have frequency specific channel state information (CSI) for each sub-band being scheduled. For scheduling downlink transmissions, the access node 100 can rely on a channel quality indicator (CQI) or other downlink channel condition information signaled by the mobile device 150 over the physical uplink control channel (PUCCH) or the physical uplink shared channel (PUSCH). Uplink channel conditions can be determined by the access node 100 using sounding reference symbols (SRS) transmitted by the mobile device 150.

Channel quality estimation for the uplink scheduler is primarily based on SRS transmitted by the mobile device 150. In certain instances uplink estimation may also be based on the demodulation reference symbols (DM-RS) transmitted over the PUSCH. Sounding resources used for channel estimation may include SRS and/or DM-RS. For example, in each cell, one or more single carrier frequency division multiple access (SC_FDMA) symbols or symbol positions are reserved for SRS transmission in every radio frame, such as the 10 millisecond (ms) radio frame used in LTE based cells. These reserved symbol positions, referred to herein as sounding resources, are then shared among the mobile devices 150 using various technologies such as time division multiple access (TDMA), interleaved frequency division multiple access (FDMA), and code division multiple access (CDMA).

The access node 100 includes a radio resource control (RRC) unit 104 that works with a radio link control (RLC) unit 106 to manage radio resources and manage connected mobile devices 150. An on-line device is a mobile device that is in an RRC connected state, transmitting/receiving data or expected to begin transmitting/receiving data. The radio resource control unit 104 receives measurements from the mobile devices 150 connected to the access node 100. These measurements 108 include mobile device information, such as transmit buffer size, which is an indication of the amount of data in the mobile device 150 waiting to be transmitted, device location, downlink channel state information, SINR, etc. The mobile device measurements 108 may also include information about the applications running on the mobile device 150, such as for example, VoIP, VoLTE, stock trading, streaming radio, and may also contain information about the data traffic type or quality of service desired.

The access node 100 also includes a physical layer 120, which is the lowest layer in the communication stack made up of the physical communication components. The physical layer 120 exchanges, i.e., transmits and receives, data and other information with one or more mobile devices 150 within the cell or connected to the access node 100. Information passes between the physical layer 120 and the radio resource control 104 and radio link control 106 through the MAC layer 116.

A sounding resource manager 114 receives mobile device information 122 associated with each mobile device 150 that is connected to the access node 100. Information about the status or state of each mobile device 150 is maintained in a status unit 110 which in certain embodiments, as will be described further below, may include various types of state models and sounding resource allocations and configurations. The sounding resource manager 114 receives mobile device information 122 from the radio resource control 104 and radio link control 106, and information such as device state 124 from the status unit 110. The sounding resource manager 114 is configured to determine when the sounding configuration of a mobile device 150 needs to be changed. When a configuration change is determined, the sounding resource manager 114 requests 126 the radio resource control 104 to perform a radio resource control reconfiguration procedure to modify the sounding configuration of the mobile device 150. Sounding resources are managed on a per cell basis so all sounding resources in a cell are managed by a single sounding resource manager 114.

One particular exemplary sounding configuration, based on a 10 Megahertz carrier frequency, could prescribe sounding over 12 RBs for each SRS transmission by a mobile device 150, requiring four transmissions to sound the entire frequency band. With this sounding configuration 48 RBs are used for sounding and 2 RBs are reserved for PUCCH and are therefore not available for use by the PUSCH. A mobile device 150 that is configured with a 5 ms SRS periodicity could sound the whole frequency band in 20 ms. This exemplary sounding configuration may be used in a cell employing LTE type wireless communication standards where the uplink is configured such that each sub-frame includes one SC-FDMA symbol for a sounding reference symbol.

Table 1 shows the exemplary sounding periods that may be configured for the 10 sub-frames into which a single 10 ms LTE type radio frame may be split. In the exemplary sounding configuration of Table 1, a mobile device 150 desiring rich sounding may be configured to transmit a sounding reference symbol during two sub-frames of every 10 ms radio frame to provide a 5 ms sounding period. For the 5 ms sounding period sub-frame 0 and sub-frame 5 are effectively paired to allow a mobile device 150 to transmit a sounding reference symbol every 5 ms. Similarly, sub-frame 1 is paired with sub-frame 6, and sub-frame 2 is paired with sub-frame 7 for 5 ms sounding reference symbol transmissions.

TABLE 1

| | Subframe Number | | | | | | | | | |
|---|---|---|---|---|---|---|---|---|---|---|
| | 0 | 1 | 2 | 3 | 4 | 5 | 6 | 7 | 8 | 9 |
| SRS period | 5 ms | 5 ms | 5 ms | 80 ms | 80 ms | 5 ms | 5 ms | 5 ms | 80 ms | 80 ms |

Sub-frames 3, 4, 8 and 9 may be used to support mobile devices 150 requiring a lower sounding rate. A mobile device 150 requiring fewer sounding resources may be configured to have an 80 ms sounding period by transmitting a sounding reference symbol once every eighth radio frame, in one of sub-frames 3, 4, 8 or 9.

When determining the number of users that may be supported by the sounding configuration shown in Table 1 some assumptions about the radio interface are needed. Assuming a cyclic shift of 4, which equates to a CDMA factor equal to four, a comb factor of 2, and that each sounding transmission covers resource blocks, there are four sounding reference symbol transmissions to cover the entire sounding band of 48 resource blocks. With these assumptions the sub-frame pair 0 and 5, and similarly sub-frame pairs 1-6 and 2-7, support 32 users with each sub-frame pair.

Table 2 shows the users supported by each sub-frame sounding reference symbol transmission. Note, that since the same users that are transmitting sounding reference symbols during sub-frames 0, 1 and 2 also transmit sounding reference symbols during sub-frames 5, 6 and 7, the sub-frames 5, 6 and 7 do not support any additional users.

TABLE 2

|  | Subframe Number | | | | | | | | | |
| --- | --- | --- | --- | --- | --- | --- | --- | --- | --- | --- |
|  | 0 | 1 | 2 | 3 | 4 | 5 | 6 | 7 | 8 | 9 |
| SRS period | 5 ms | 5 ms | 5 ms | 80 ms | 80 ms | 5 ms | 5 ms | 5 ms | 80 ms | 80 ms |
| Supported Users | 32 | 32 | 32 | 256 | 256 |  |  |  | 256 | 256 |

In total, the exemplary sounding configuration described above supports 96 mobile devices with 5 ms sounding and 1024 mobile devices with 80 ms sounding. The sounding scheme using two sounding configurations described above is presented as an aide to understanding only and those skilled in the art will readily recognize that many other sounding period configurations are possible with different sounding periods and more or less than two different sounding periods configured concurrently on different mobile devices in the same cell.

Since a limited number of mobile devices (96 in the above example) may be configured for rich (5 ms sounding period in the above example) sounding, when a cell experiences a large volume of connected devices, not all connected devices may be configured for rich sounding. A conventional method for allocating sounding resources is to use a first come first serve approach where a mobile device is configured for the best available sounding period. With this approach the first 96 mobile devices connecting to a cell would be configured for 5 ms sounding period and additional mobile devices would be configured to 80 ms sounding as they connect to the cell. While easy to implement, this approach does not make efficient use of the sounding resources as the first mobile devices to connect may be near the center of the cell where signal strength is good and the throughput gain achieved with rich sounding may not be large. It may also be the case that the devices configured for rich sounding may not be transmitting data, in which case the rich sounding resources are effectively wasted.

Figure 2:
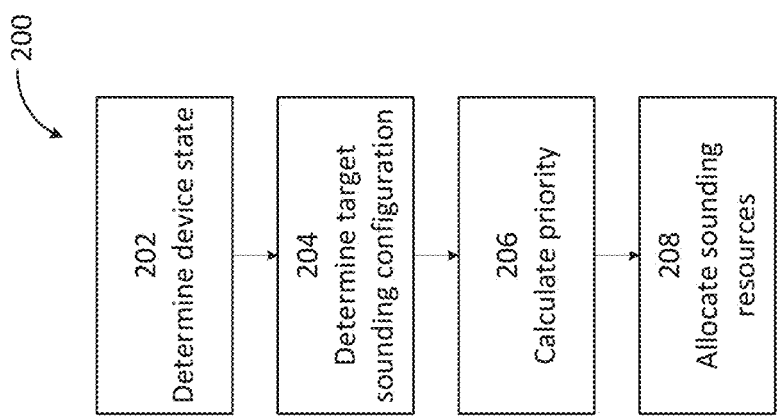
FIG. 2 illustrates a flow chart of an exemplary method for allocation of sounding resources in accordance with the aspects of the disclosed embodiments.

FIG. 2 illustrates a flow chart of an embodiment of a method 200 for allocating sounding resources appropriate for use in a sounding resource manager such as the sounding resource manager 114 described above and with reference to FIG. 1. The method 200 begins by determining 202 a device state or activity state of a mobile device 150 for which sounding resources are being allocated. The device state is based on device information and includes a variety of information about a particular mobile device 150 such as transmit buffer volume, traffic type of the currently running application on the mobile device 150, resource block usage patterns, frequency of resource block allocations, or other mobile device and traffic characteristics.

The term "device information" as used herein refers to a set or other collection of data and information pertaining to a single mobile device. The device information may include information collected by a mobile device 150 and sent to the access node 100, such as buffer volume, which in an LTE like system may be sent with buffer status reports, downlink channel quality information such as the channel quality indicator (CQI), downlink signal to interference plus noise ratio (SINR), power headroom reports, information about the traffic type such as voice over internet protocol (VoIP) or voice over long term evolution (VoLTE), and the type of a running application, such as for example, a securities trading application, web browsing application, or web posting application.

Device information may also include data and information determined at the access node 100 based on signals received from the mobile device 150 such as SINR of the uplink, number and frequency of resource blocks being granted to the mobile device 150 etc. Device information may refer to the information about a mobile device 150 being serviced by the access node 100, or device information may refer to the mobile device 150 itself where the meaning will become clear based on the context.

The device state is determined 202 using a state model for each mobile device 150 based on aspects of the activity of the mobile device 150 in generating user plane data for transmission over the uplink. The term "traffic" as used herein refers to the data being transmitted by the mobile device 150 and refers to both the volume of data as well as other data transmission characteristics such as frequency of transmissions, etc. For example, in certain embodiments the device state characterizes the status of the transmit buffer in the mobile device 150 and may be based on buffer volume measurements. When this is the case the device state may be referred to as a buffer state.

A target sounding configuration is then determined 204 based on the device state determined in step 202 as well as other device information. In the exemplary sounding configuration described above, the target sounding configuration is primarily the time period over which the mobile device 150 sounds the entire carrier bandwidth. The sounding configuration determines the amount of sounding resources allocated to a mobile device 150. Rich sounding provides a shorter sounding period and requires a greater amount of sounding resources. The target sounding configuration of a mobile device 150 changes in accordance with changes to the mobile device condition, and these changes can occur many times during the active session of the mobile device 150.

In heavily loaded cells, all available sounding resources may be in use, which means all radio resources allocated for sounding reference symbol transmission are being used by a mobile device 150 connected to the cell. When this occurs additional sounding resources may not be allocated to a newly connected mobile device or to a mobile device needing additional sounding resources until sounding resources have been reclaimed from a mobile device disconnecting from the cell or by changing the sounding configuration of a connected mobile device to a lower sounding configuration. A lower sounding configuration is one requiring fewer sounding resources.

Essentially there is competition among mobile devices 150 for available sounding resources. To determine which mobile devices should get their target sounding configuration and which mobile devices should receive lower sounding configurations, a priority is calculated 206 for each mobile device 150. The calculated priority 206 may be based on the device state as well as the device information. Sounding resources are then allocated based on the target sounding configuration and priority of each mobile device 150.

Figure 3:
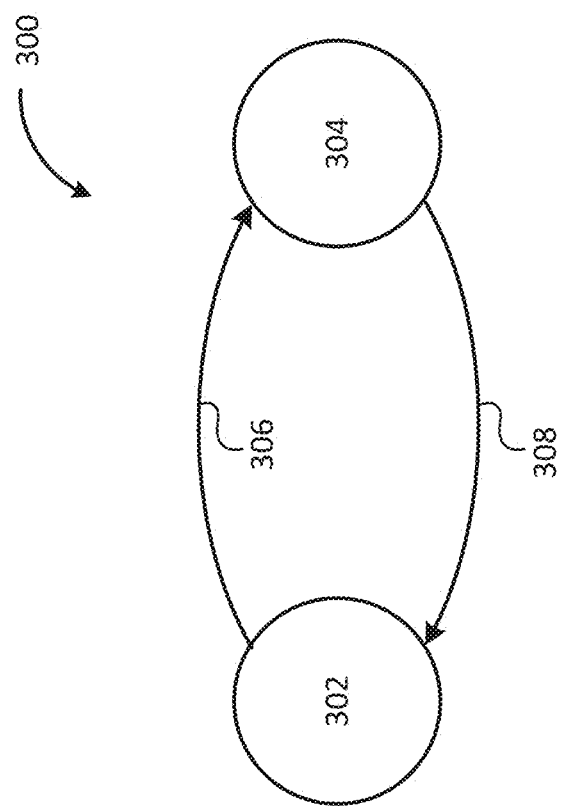
FIG. 3 illustrates an exemplary embodiment of a device state model appropriate for determining buffer states in accordance with the aspects of the disclosed embodiments.

One embodiment of a device state is based on transmit buffer volumes of a mobile device 150 and may be referred to as a buffer state. For example, in certain wireless systems, the transmit buffer volume is available at an access node 100 through buffer status reports (BSR) which are sent by mobile devices 150 over the uplink. FIG. 3 illustrates an embodiment of a finite state machine 300 having two buffer states appropriate for determining a buffer state for a mobile device such as mobile device 150. In the finite state machine 300, a first buffer state 302 represents a mobile device 150 having a low buffer volume and a second buffer state 304 represents a mobile device 150 having a high buffer volume. When a mobile device 150 becomes radio resource control connected it is initialized to the low buffer state 302. Thereafter, while the mobile device 150 remains radio resource control connected, the device state is updated according to the finite state machine 300. Transitions between the low buffer state 302 and the high buffer state 304 occur based on thresholds and timers.

When the buffer volume of a mobile device 150 exceeds a first threshold, such as 6000 bits, for a first predetermined period of time, such as zero or more milliseconds, the device state moves or transitions 306 to the high buffer state 304. When the buffer volume of a mobile device 150 falls below a second predetermined threshold, such as 100 bits, for a second predetermined period of time, such as 25 ms, the device state moves or transitions 308 to the low buffer state 302. The thresholds and time periods may be configured by an operator, hard coded in the access node 100, or automatically updated from time to time based on information about the cell.

Using a low value for the buffer volume thresholds allows users with lower transmission volumes to benefit from rich sounding and possibly obtain better performance. However, low buffer volume thresholds result in a greater number of radio resource control reconfigurations to adjust the sounding resources and sounding reference symbol transmission periods, especially when the cell loading is high. With higher buffer volume thresholds, fewer radio resource reconfigurations occur, and mobile devices sending large data volumes, such as large file uploads and attachments, should benefit. Therefore, selection of the buffer volume thresholds, influences overall behavior and performance of the wireless network.

Figure 4:
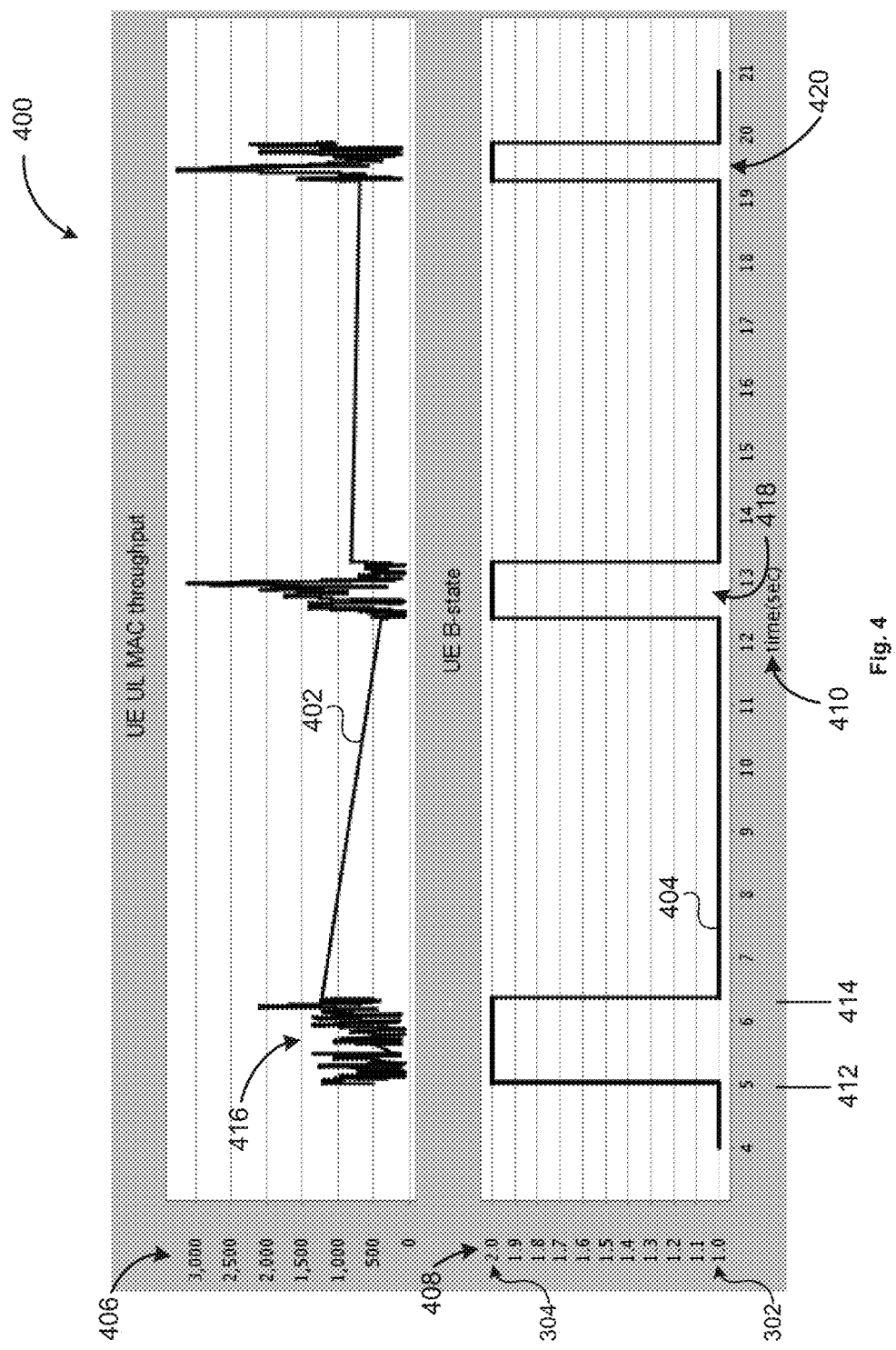
FIG. 4 illustrates a graph showing the relationship between media access control layer throughput and device state in accordance with the aspects of the disclosed embodiments.

FIG. 4 illustrates a graph 400 showing the relationship between media access control (MAC) layer throughput and device state for the finite state machine or device state model 300 having two buffer states. MAC throughput is shown in the upper graph 402 where the vertical axis 406 represents MAC layer throughput in bits per second and the horizontal axis 410 shows time in seconds. The lower graph 404 shows buffer state of a mobile device 150 where a value of 1 on the vertical axis 408 represents the low buffer state 302 and a value of 2 on the vertical axis 408 represents the high buffer state 304. The values of one and two are derived, as will be discussed in further detail below, from values assigned to the buffer states during priority calculations.

In the example of FIG. 4, at about five (5) seconds 412 the mobile device 150 places a large amount of data into its transmit buffer causing the buffer state 404 to transition to the high buffer state 304. From about five seconds 412 until about six and a half seconds 414 the mobile device 150 transmits the data as shown by the MAC throughput 416 during this period.

Once the data transmission has completed and the transmit buffer volume of the mobile device 150 falls below the predetermined threshold value for a predetermined period of time the buffer state 404 transitions at about six and a half seconds 414 back to the low buffer state 302. Each time 418, 420 the mobile device 150 transmits a large volume of data, the buffer state transitions to the high buffer state and the MAC throughput increases until the data transmission has completed.

A target sounding configuration for a mobile device 150 is determined based on the device state of the mobile device 150 and may also be based on other values in the device information. In certain embodiments the device state may be a buffer state such as the buffer state derived from the device state model 300 described above. Alternatively, other types of device states based on different criteria and different device state models may be used for determination of a target sounding configuration for the mobile device 150. Determining a target sounding configuration based on a device state derived from a device state model provides more efficient use or allocation of sounding resources than conventional approaches.

In conventional approaches it is common to assign a sounding configuration on a best available basis, where a mobile device 150 is given the best available configuration when it connects to an access node 100 resulting in all the rich sounding configurations being assigned to the first mobile devices to connect and subsequent mobile devices receiving a lower sounding configuration when they connect. This often results in rich sounding configurations being assigned to mobile devices that are doing little or no data transmission and low sounding configurations being assigned to devices doing large data uploads. A low sounding configuration is a sounding configuration that has few or a low amount of sounding resources providing a longer sounding period and less accurate channel information. To meet quality of service requirements it may be necessary to perform a radio resource control reconfiguration to change the sounding configuration each time a mobile device 150 begins to transmit data.

Radio resource control reconfigurations incur overhead, using radio resources that could otherwise be used for data transmissions and also risk connection loss and dropped phone calls. An alternative strategy disclosed herein is to assign only a justifiable amount of sounding resources to a mobile device 150 when it connects where the amount of sounding resources assigned are based on determination of a target sounding configuration.

In one embodiment the target sounding configuration may be based on the buffer state as described above. Mobile devices 150 with a higher volume buffer state 304 will have a better target sounding configuration than mobile devices 150 with a lower volume buffer state 302. This is done because mobile devices 150 in the high buffer state 304 will be transmitting more data than mobile devices 150 in the low buffer state 302, and will likely benefit more from having a rich sounding configuration. Mobile devices 150 in the low buffer state 302 will also benefit indirectly from this sounding resource assignment. Fewer resource blocks will be used up by mobile devices 150 in the high buffer state 304 due to the better throughput achieved from use of rich sounding. Basing sounding configuration on device state means that sounding configurations may be changed each time mobile devices 150 connect or change their device state with minimal overhead or cost.

An embodiment of determining a target sounding configuration for a mobile device 150 based on buffer state may be based on the two buffer states 302, 304 in the device state model 300 described above. In a system having two sounding configurations referred to as X and Y, where sounding configuration X has a sounding period of 5 ms and sounding configuration Y has a sounding period of 80 ms, the two buffer states 302, 304 can be directly mapped to the two sounding configurations X and Y as shown in Table 3. While in the low buffer state 302, corresponding to a mobile device 150 having a low transmit buffer volume, the mobile device 150 does not need rich sounding and can be allocated a lower amount of sounding resources such as the 80 ms sounding period provided by sounding configuration Y. When the mobile device 150 moves into the high buffer state 304 where the mobile device 150 has a large volume of data in its transmit buffer, the mobile device 150 is likely to benefit from a large number of sounding resources and shorter sounding period, 5 ms, corresponding to the richer sounding configuration X. The rich sounding provided by sounding configuration X allows for better frequency selective scheduling to improve uplink transmissions for the mobile device 150.

With the use of device states, such as the buffer states 302, 304, when an active mobile device 150 is in the low buffer state 302, the mobile device 150 will be assigned a lower amount of sounding resources corresponding to sounding configuration Y even though there are enough sounding resources available to assign the mobile device 150 to the high sounding configuration X. By assigning sounding resources based on the device state, when a mobile device 150 transitions to a higher buffer state 304 it is easier to assign a richer sounding configuration X without having to downgrade a mobile device in the lower buffer state 302 from sounding configuration X to sounding configuration Y.

TABLE 3

| Buffer State | Preferred Sounding configuration | sounding period [ms] |
| --- | --- | --- |
| 304 | X | 5 |
| 302 | Y | 80 |

Figure 5:
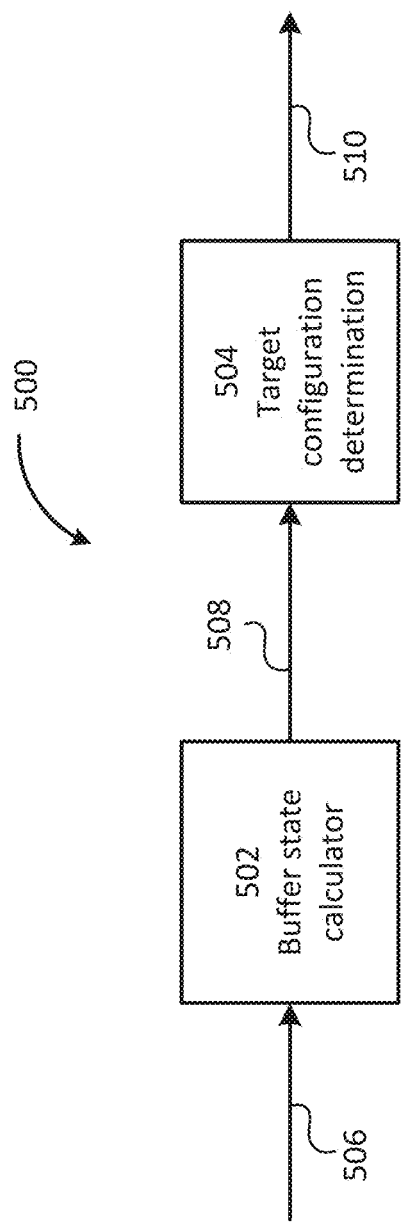
FIG. 5 illustrates a block diagram of an exemplary embodiment of a method for selecting a target sounding configuration in accordance with the aspects of the disclosed embodiments.

FIG. 5 illustrates a block diagram of an exemplary embodiment of a method 500 for selecting a target sounding configuration 510 based on transmit buffer volume or size 506. In the block diagram illustrated in FIG. 5, and similarly in subsequent figures, the boxes 502, 504 represent processing elements and the arrows 506,508,510 represent data items passed into or created by the processing elements 502, 504. The exemplary method 500 receives transmit buffer volume 506 from a mobile device 150 and uses the transmit buffer volume 506 to calculate 502 or determine a buffer state 508 for the mobile device 150. Determination of the buffer state 508 may be based for example on the two buffer state model 300 described above in which case the buffer state 508 would be one of the two buffer states 302 or 304. The determined buffer state 508 is then used to determine 504 a preferred sounding configuration 510. Determination 504 of the target sounding configuration 510 is based on the buffer state 508, which in the present example is a buffer state such as buffer state 302 or buffer state 304, and may be determined using a mapping, such as the mapping described above and shown in Table 3. Alternatively other determination 514 means may be used including mappings and computations based on device information corresponding to the mobile device 150 being configured.

To aide selection of which mobile devices should be reconfigured, a priority is calculated for each mobile device and is used to determine the relative importance that different mobile devices should receive for their target sounding configuration. Priority for a given mobile device 150 is based on the device information for that mobile device and on the device state determined 502 for the mobile device.

For example, in the exemplary embodiment described above, priority may be calculated based on two inputs. The first input is the buffer state from the buffer state model 300. The low buffer state 302 is assigned a value, for the purposes of priority calculation, of one and the high buffer state 304 is assigned a value of two. The second input to the exemplary priority calculator is the downlink (DL) reference symbol received power (RSRP). The downlink reference symbol receive power has units of decibel-milliwatts (dBm) and may be used in the priority calculation without further modifications. The downlink reference symbol receive power is representative of the downlink path loss and approximates the uplink path loss of a mobile device 150. The uplink path loss helps identify the distance between the mobile device 150 and the serving access node 100.

Mobile devices 150 near the edge of the cell are farther away from the serving access node 100 and will likely experience a greater path loss than a mobile device 150 that is close to the serving access node 100. The mobile devices 150 on the cell edge tend to have the lowest uplink throughput since full path loss compensation is not used in uplink power control due to power limitations in mobile devices. Mobile devices 150 can thus be differentiated based on their buffer state 302 or 304, and their path losses. An exemplary embodiment of a priority calculation is shown in Equation 1:

$$P_{md} = KB_s - RSRP_{dl}, \quad (1)$$

where $P_{md}$ is the priority being calculated for the mobile device, $B_s$ is the buffer state value as described above, and $RSRP_{dl}$ is the downlink reference symbol receive power of the mobile device, and K is a constant. The constant K can in general take on any desired values. In certain embodiments it is beneficial to keep the value of the constant K roughly greater than the possible range of values for the downlink reference symbol receive power, $RSRP_{dl}$ of the mobile device.

For example in the exemplary priority calculation shown in Equation (1) the constant K may be about 500. The transmit buffer volume of the mobile device may be used in the priority calculation after being quantified as a buffer state as described above, or alternatively the uplink transmit buffer volume of the mobile device 150 may be used in the priority calculation unchanged with units such as bits.

Figure 6:
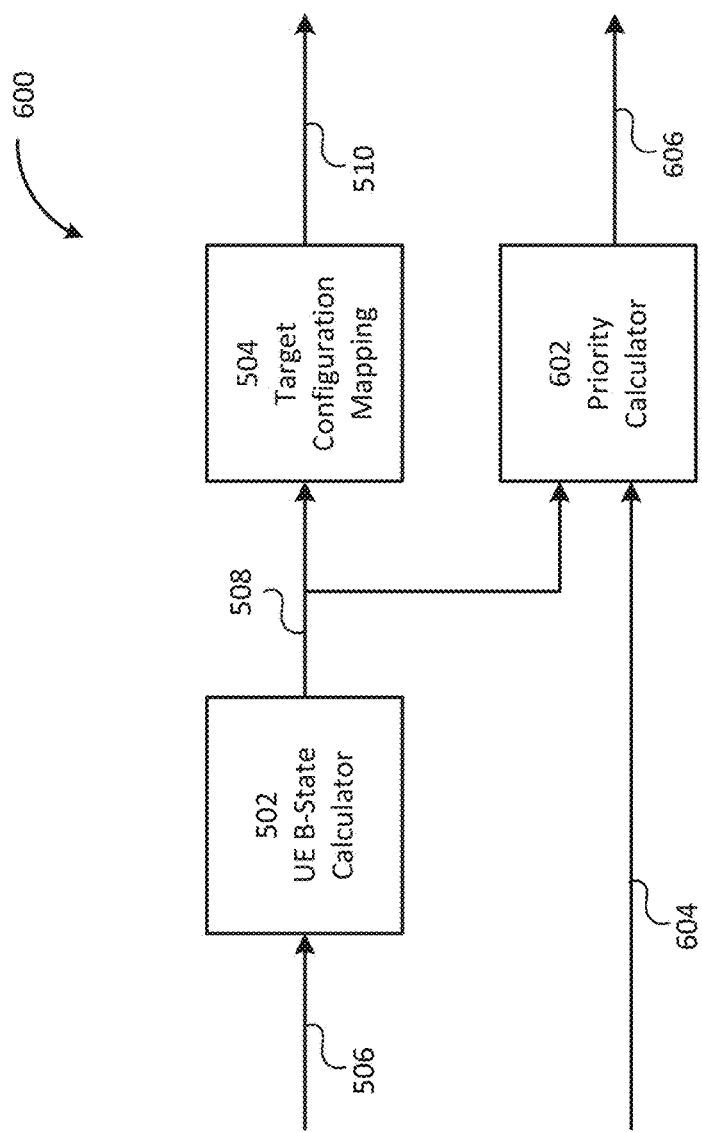
FIG. 6 illustrates an exemplary embodiment of a method for calculating priority of a mobile device in accordance with the aspects of the disclosed embodiments.

FIG. 6 illustrates an exemplary embodiment of a method 600 for calculating priority of a mobile device 150. Calculation of the mobile device priority may be combined with the mobile device target sounding configuration determination method 500 described above and with reference to FIG. 5. The mobile device priority calculator 602 takes as input the mobile device buffer state 508 along with the reference symbol receive power in dBm 604. The priority calculator assigns a value to each buffer state 508, such a value of one (1) for the low buffer state 302 and a value of two (2) for the high buffer state when using a two buffer state model 300 as described above. A priority calculation 602 such as the priority calculation shown in Equation (1) is performed to produce a priority 606 for the mobile device 150.

Figure 7:
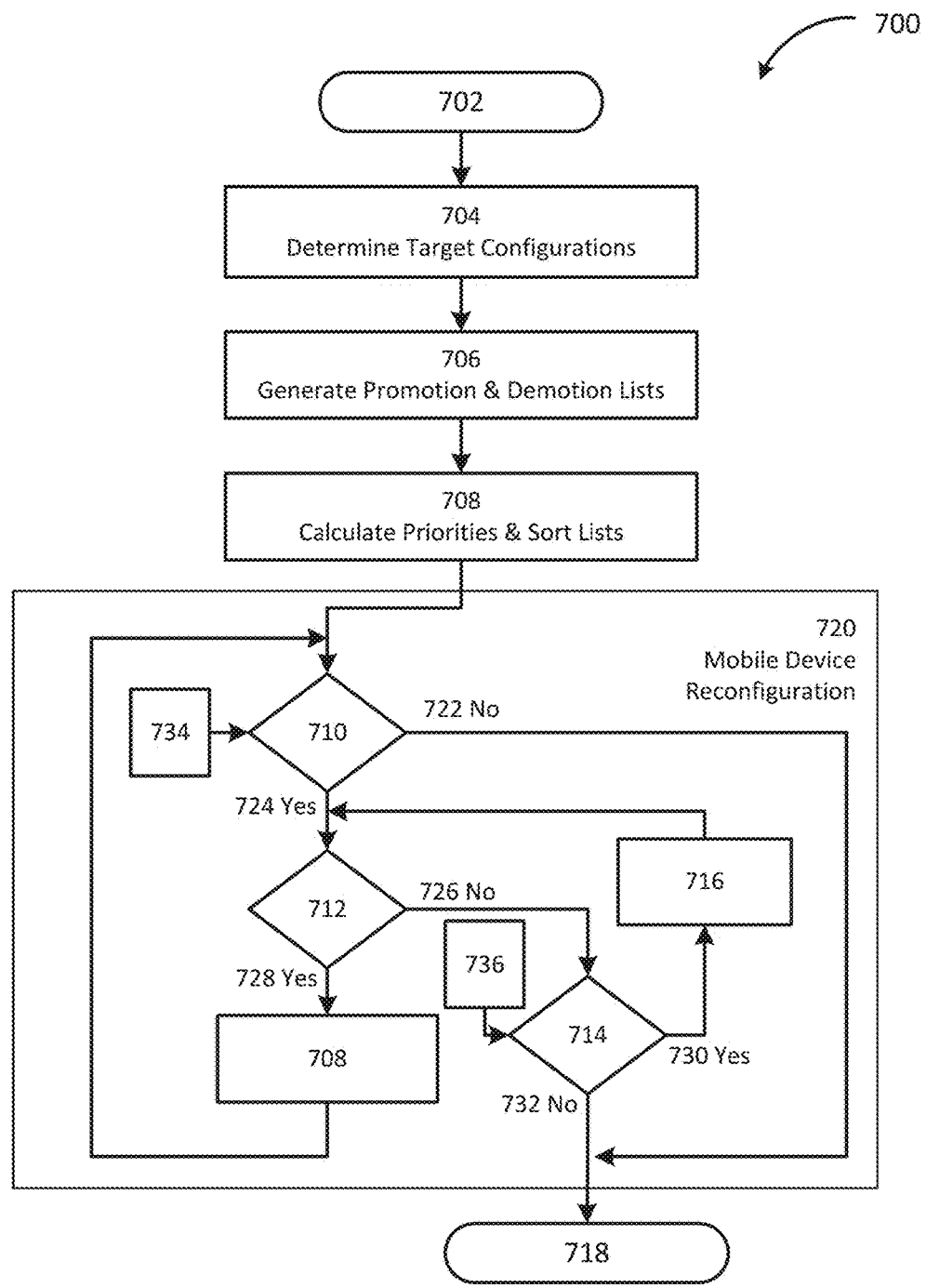
FIG. 7 illustrates an exemplary embodiment of a sounding resource allocation algorithm incorporating aspects of the disclosed embodiments.

A sounding resource allocation algorithm for a cell can now be constructed using the target sounding configuration determination and priority calculation described above and with reference to FIG. 6. An exemplary embodiment of a sounding resource allocation algorithm 700 is illustrated in FIG. 7. The exemplary sounding resource allocation algorithm 700 may be used to allocate sounding resources to active mobile devices 150 within a cell. Sounding resources are the radio resources used for sounding reference symbol transmission. The sounding resource allocation algorithm 700 compares the target sounding configuration determined based on the device state of a mobile device 150 to the current sounding configuration of the mobile device 150. When the current sounding configuration is worse or includes fewer sounding resources than the target sounding configuration determined for the mobile device 150, the sounding resource allocation algorithm 700 attempts to promote or upgrade the mobile device 150 to its target sounding configuration.

When all sounding resources in a cell are in use or there are not enough sounding resources available to promote the mobile device 150, the available sounding resources may be increased by demoting a mobile device whose current sounding configuration includes more sounding resources than required by the target sounding configuration for that mobile device, thereby freeing up additional sounding resources that may then be used to promote another mobile device. Under heavily loaded cell conditions, this process of demoting one device to free up sounding resources for another device often results in swapping sounding configurations or sounding resources between a mobile device that is not currently transmitting data and a mobile device that is beginning a data transmission.

The sounding resource allocation algorithm 700 is scheduled to run repeatedly and may be configured to run periodically or a periodically based on a timer such as every 100 ms or other desired time interval. Alternatively the sounding resource algorithm 700 may be triggered by a change to the sounding resources being used in a cell. This can occur when a mobile device 150 leaves the cell, a new mobile device connects to the cell, or when there is a change to the target sounding configuration of a mobile device, such as when the device state of a mobile device changes. Each pass of the allocation algorithm 700 begins 702 based on the desired trigger.

A target sounding configuration to be used during the next time period is determined 704 for each mobile device 150 connected to the access node 100. The term "next time period" refers to a period of time that is subsequent to or occurs after the current pass of the resource allocation algorithm 700 has completed and mobile devices have been reconfigured based on the sounding configuration outputs 708, 716 by the sounding resource allocation algorithm 700.

Determination 704 of the preferred or target sounding configuration for each mobile device 150 being serviced by the access node 100 may be done by, referring to FIG. 2, determining 202 a device state based on a device information and a device state model, then determining 204 a preferred or target sounding configuration based on the device state. The mobile devices are then placed onto a promotion list or a demotion list 706 based on the current sounding configuration and target sounding configuration of each mobile device 150.

When a determined target sounding configuration for a mobile device 150 requires more sounding resources than it currently has, the mobile device 150 is placed on the promotion list. When a determined target sounding configuration for a mobile device 150 requires fewer sounding resources than it currently has, the mobile device 150 is placed on a demotion list. When there are multiple devices on the promotion and demotion lists it may become difficult to determine which mobile devices should be promoted and which mobile devices should be demoted. To aid in the selection of a mobile device for promotion and demotion a priority is calculated 708 for each mobile device on both the promotion list and the demotion list and each list is sorted based on the calculated priorities.

The mobile devices on the promotion and demotion lists are then processed by a reconfiguration process 720. The reconfiguration process 720 attempts to promote the mobile devices for which the respective sounding configuration requires more sounding resources than it is currently using. When there are insufficient sounding resources available in the cell to promote all mobile devices on the promotion list, the reconfiguration process 720 demotes mobile devices on the demotion list in order to increase the available sounding resources for promotion of mobile devices.

In one embodiment, the reconfiguration process checks 710 the promotion list 734 for a mobile device requiring additional sounding resources. If there are no mobile devices 150 on the promotion list 724, branch 722 is taken and the reconfiguration process 720 is complete and proceeds to exit 718. When there is a mobile device 150 on the promotion list, step 710 removes the highest priority mobile device from the promotion list 734 and proceeds on branch 724 where a check is made 712 to determine if there are enough available sounding resources to upgrade the mobile device removed from the promotion list 734 at step 710 to its target sounding configuration. When sounding resources are available branch 728 is taken and the target sounding configuration is output to the mobile device 150 and the reconfiguration process 720 returns to step 710 to check the promotion list 734 for another mobile device to be removed and promoted.

If at step 712 it is determined that there are insufficient sounding resources available to promote the mobile device that was removed from the promotion list 734 at step 710, the reconfiguration process 720 proceeds along branch 712 where at step 714 the demotion list 736 is checked and a mobile device is removed from the demotion list 736. When there are no mobile devices on the demotion list 736, branch 732 is taken and the reconfiguration process 720 is complete and proceeds to the exit 718. When there is a mobile device on the demotion list 736, branch 730 is taken and the mobile device is removed from the demotion list and its sounding configuration is downgraded at step 716, by outputting the target sounding configuration for the removed device, thereby freeing up sounding resources that may be used to upgrade a mobile device desiring additional sounding resources.

The reconfiguration process 720 then returns to step 712 where a check is made to determine if there are sufficient available sounding resources to upgrade the mobile device that was removed from the promotion list 736 at step 710. The reconfiguration process 720 continues iterating through the promotion list until there are no mobile devices remaining on the promotion list, or until all devices on the demotion list have been downgraded and all sounding resources in the cell are in use. The promotion list contains all mobile devices that have a target sounding configuration requiring more sounding reference symbol resources than their current sounding configuration, while the demotion list contains all mobile devices that have a target sounding configuration requiring fewer sounding reference symbol resources than their current sounding configuration.

With the finite state machine 300 having two buffer states 302, 304 described above, each mobile device 150 can be assigned to one of only two states: a low buffer state 302, and a high buffer state 304. Table 4 shows how mobile devices may be assigned to the promotion and demotion lists based on their current buffer state and the current and target sounding configurations. The first three columns list the possible buffer state, current sounding configuration, and target sounding configuration, while the last column shows the list assignment for each respective combination of buffer state and sounding configurations.

In the embodiment shown in Table 4 the system has two possible sounding configurations referred to as X and Y, where sounding configuration X has a sounding period of 5 ms corresponding to a sounding configuration requiring more sound reference symbol resources than sounding configuration Y, and sounding configuration Y has a sounding period of 80 ms corresponding to a sounding configuration requiring fewer sounding reference symbol resources than sounding configuration X. As can be seen in Table 4 when a current sounding configuration for a mobile device 150 is the same as the target sounding configuration for the mobile device 150, the mobile device 150 is not placed on either the promotion list or the demotion list.

TABLE 4

| Device's buffer state | Device's current configuration | Device's target configuration | Action taken toward Device |
| --- | --- | --- | --- |
| 304 | X | X | No action taken |
| 304 | Y | X | placed on promotion list |
| 302 | X | Y | placed on demotion list |
| 302 | Y | Y | No action taken |

Figure 8:
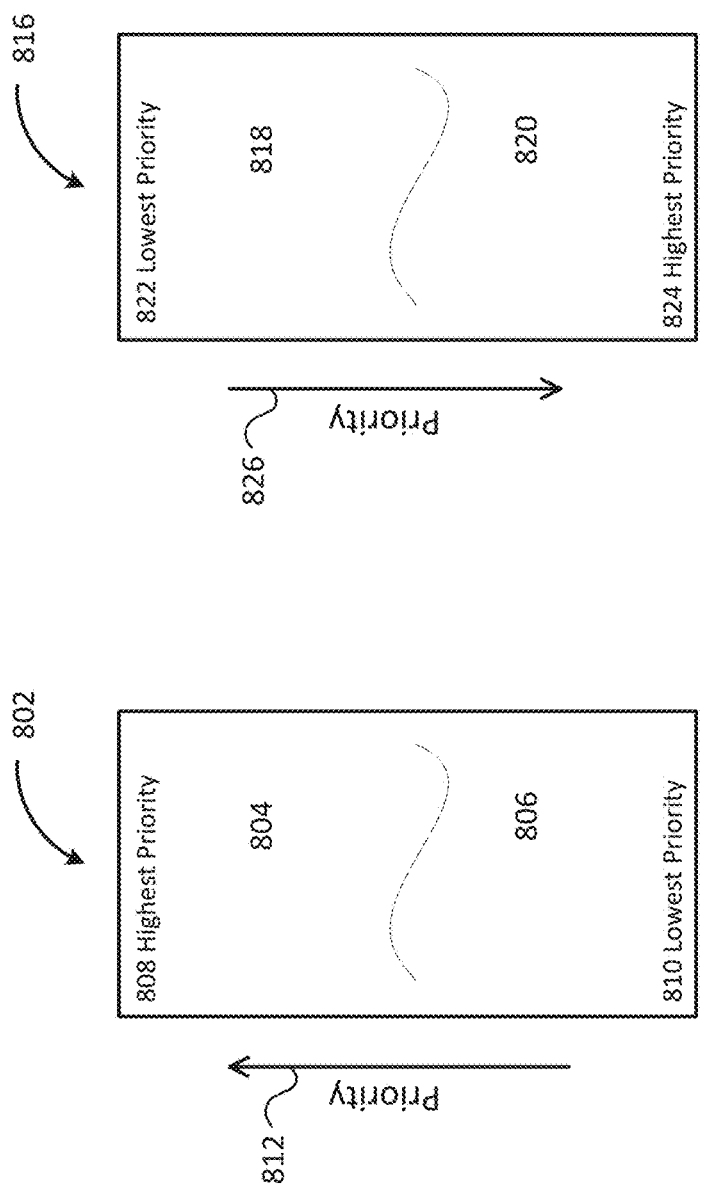
FIG. 8 illustrates an exemplary embodiment of a promotion list and a demotion list in accordance with aspects of the disclosed embodiments.

FIG. 8 illustrates an exemplary embodiment of a promotion list 802 and demotion list 816 as may be formed from the two buffer state model and two sounding configuration example shown in Table 4. Once mobile devices have been placed on the respective promotion and demotion lists, a priority is calculated, such as with the priority formula in Equation (1) above, for each mobile device on each list. The lists are sorted according to the calculated priority of each mobile device 150. The promotion list 802 is sorted with increasing priority as shown by the arrow 812 resulting with the highest priority mobile device being placed at the top 808 of the promotion list 802 and the lowest priority mobile device placed at the bottom 810 of the promotion list 802.

In the sounding resource allocation algorithm 700 mobile devices are removed and processed from the top of each list so the first mobile device to be promoted will have the highest priority and the first mobile device demoted will have the lowest priority. Because in the exemplary embodiment illustrated in FIG. 8, the priority calculation is based on the reference symbol receive power for each mobile device, mobile devices with lower reference symbol receive power are placed at the top 808 of the promotion list. Since the distance between a mobile device 150 and the access node 100 is inversely correlated with the reference symbol receive power, this prioritization results in mobile devices located near the cell center being placed toward the bottom of the promotion list 806 and mobile devices located farther from the access node 100 being located toward the top 804 of the promotion list. The reconfiguration algorithm 720 considers devices for promotion in order from highest priority 808 to lowest priority 810 on the promotion list. Thus, with the priority calculation based on reference symbol received power as shown in Equation 1, preference is given to cell edge devices thereby providing better performance to the cell edge devices.

In a heavily loaded cell, where all or nearly all the sounding reference symbol resources are in use, it becomes necessary to downgrade a mobile device which currently has a high resource sounding configuration in order to free up sounding resources for promotion of another mobile device. Two mobile devices essentially swap or exchange their sounding configurations or sounding resources.

To determine which mobile device 150 should be demoted to free up sounding resources, a demotion list 816 is used. The demotion list 816 is similar to the promotion list 802 except it is sorted in reverse order 826 with the highest priority mobile device being placed at the bottom 824 of the demotion list 816 and the lowest priority mobile device being placed at the top 822. With the previous priority calculation example shown in Equation 1, sorting 826 places mobile devices near the cell center toward the top 818 of the demotion list and mobile devices near the cell edge toward the bottom 820 of the demotion list 816. The lowest priority mobile device 822 is taken from the demotion list 816 to have its sounding configuration swapped or exchanged with the highest priority device 808 taken from the promotion list.

Figure 9:
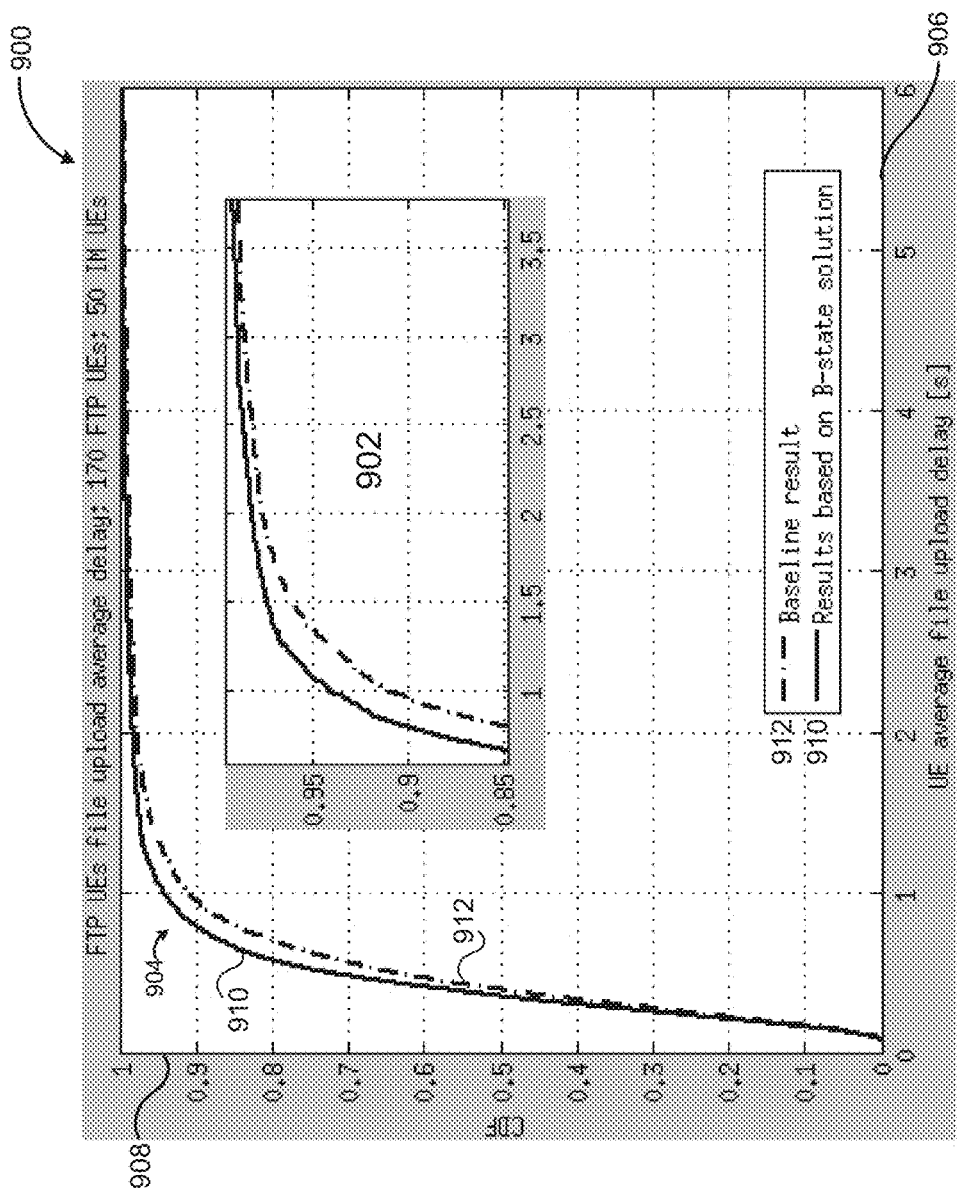
FIG. 9 illustrates a graph of the cumulative distribution function of file upload delay for an exemplary sounding resource allocation algorithm incorporating aspects of the disclosed embodiments.

FIG. 9 illustrates a graph 900 of the cumulative distribution function (CDF) of file upload delay for the exemplary embodiment of the sounding resource allocation algorithm 700 described above having two buffer states and two sounding configurations, as compared to a baseline system using a first come first serve approach to sounding resource allocation. The cell illustrated by the graph 900 is based on a simulated wireless network that includes 170 mobile devices performing a file transfer protocol data upload and 50 mobile devices engaged in instant messaging. In the graph 900, the horizontal axis 906 represents file upload delay in seconds, and the vertical axis 908 represents a cumulative distribution function (CDF) with a value between zero and 1.

The first graph 912 illustrated with a broken line provides the CDF for a baseline system, and the second graph 910 illustrated with a solid line shows the CDF for a system incorporating the exemplary finite state machine 300 based sounding resource allocation algorithm 700. The greatest performance improvements, nearly 10%, are achieved in the area 904 around 1 second of delay. An enlargement of this portion 904 of the graph 900 is provided by the inset graph 902. As can be seen in the graphs 900 and 902, the improved sounding resource allocation algorithm 700 described herein provides significantly improved performance over a baseline system.

Figure 10:
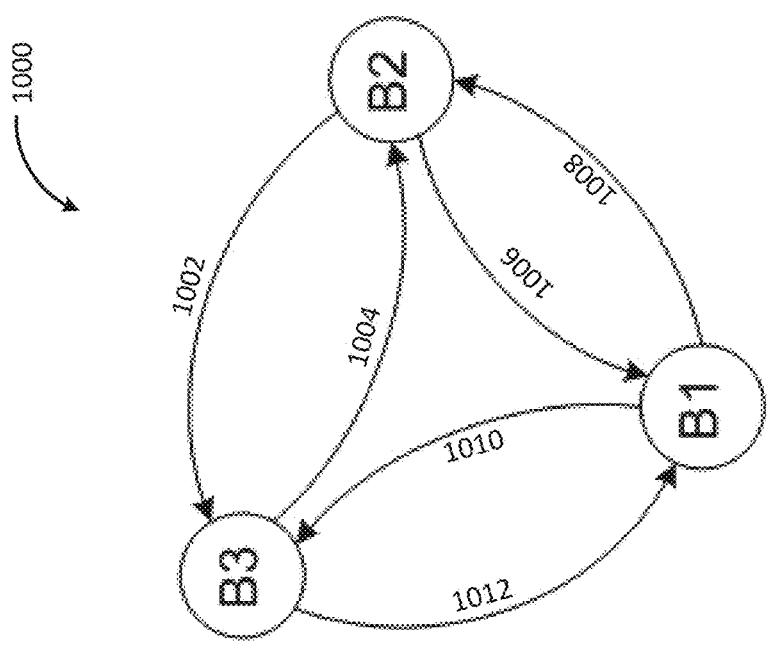
FIG. 10 illustrates an embodiment of a device state model having three buffer states for a wireless communication system incorporating aspects of the disclosed embodiments.

In certain embodiments it is advantageous to use device state models having more than two states in order to better characterize the mobile device data traffic and improve selection of the target sounding configuration. FIG. 10 illustrates a exemplary embodiment of a device state model 1000 having three buffer states, B1, B2, and B3. The three buffer states B1, B2, and B3 may be used to represent three transmit buffer volume levels where buffer state B1 represents a low buffer volume, buffer state B2 represents a medium buffer volume, and buffer state B3 represents large buffer volumes. The advantage of the three buffer state model 1000 over the two buffer state model is that the three buffer state model 1000 allows prioritization of mobile devices having large buffer volumes over those mobile devices with only medium buffer volumes. Preference for a rich sounding configuration is given by this device state model 1000 to mobile devices that will need to be scheduled more frequently over a longer period of time to empty their transmit buffers. The sounding resource allocation algorithm 700 remains unchanged except that determination of the target configurations 704 and calculation of priorities 708 is based on a three buffer state model 1000.

State transitions for the three buffer state model 1000 are determined by two threshold volumes thB2 and thB3. In one embodiment the low buffer volume threshold thB2 may be about 1000 bits and the high buffer volume threshold may be about 6000 bits. A delay time T may also be used to avoid chattering or unwanted transitions between states. Table 5 shows the state transitions for the three buffer state model 1000. The first column, initial buffer state, shows the starting state for each transition and the second column, final buffer state, shows the ending state for each transition. The last column, condition for transition, shows the conditions causing the transition between the buffer states. In the last column, "volume" is the transmit buffer volume of the mobile device.

In the embodiment shown in Table 5 transitions from a higher buffer state to a lower buffer state 1004, 1006, 1012 occur after the transmit buffer volume falls below a threshold volume, thB2 or thB3, for a certain period of time T. Transitions from a lower buffer volume state to a higher buffer volume state 1008, 1002, 1010 occur when the transmit buffer volume exceeds a threshold volume thB2, thB3.

In certain embodiments is desirable to use a timer value for all state transitions 1002, 1004, 1006, 1008, 1010, 1012. A first timer value may be used for transitions 1002, 1008, 1010 from a lower buffer state to a higher buffer state. A second timer value may be used for transitions 1004, 1006, 1012 from a higher buffer state to a lower buffer state.

TABLE 5

| Initial Buffer state | Final Buffer state | Condition for transition |
|---|---|---|
| B1 | B2 | thB3 >= Volume > thB2 (1008) |
| B1 | B3 | Volume > thB3 (1010) |
| B2 | B3 | Volume > thB3 (1002) |
| B2 | B1 | Volume < thB2 for period T (1006) |
| B3 | B2 | Volume < thB3 for period T (1004) |
| B3 | B1 | Volume < thB2 for period T (1012) |

The target sounding configuration may be determined from the three buffer state model 1000 using a mapping or other algorithm. One embodiment of a mapping from buffer state to target sounding configuration is illustrated in Table 6. Table 6 shows a mapping from the buffer state B1 B2, B3 depicted in the buffer state model 1000, to the two sounding configurations X and Y described above. Alternatively a system having more or less than two sounding configurations may be advantageously employed with buffer state model 1000 and the sounding resource allocation algorithms disclosed herein. Both buffer states B2 and B3 receive the same target sounding configuration. However, as will be discussed further below, buffer states B2 and B3 receive different priority values.

TABLE 6

| Buffer State | Target Sounding configuration | sounding period [ms] |
|---|---|---|
| B3 | X | 5 |
| B2 | X | 5 |
| B1 | Y | 80 |

Calculation of priority values for the three buffer state model 1000 may be done using the priority formula shown earlier in Equation (1). However, the three buffer states are assigned different values for the purposes of priority calculation: buffer state B1 has a value of 1, B2 has a value of 2, and B3 has a value of 3. With these values for each buffer state B1, B2, B3, mobile devices having a buffer state of B3 receive higher priority, and consequently preference for promotion, over mobile devices having a buffer state of B2.

Figure 11:
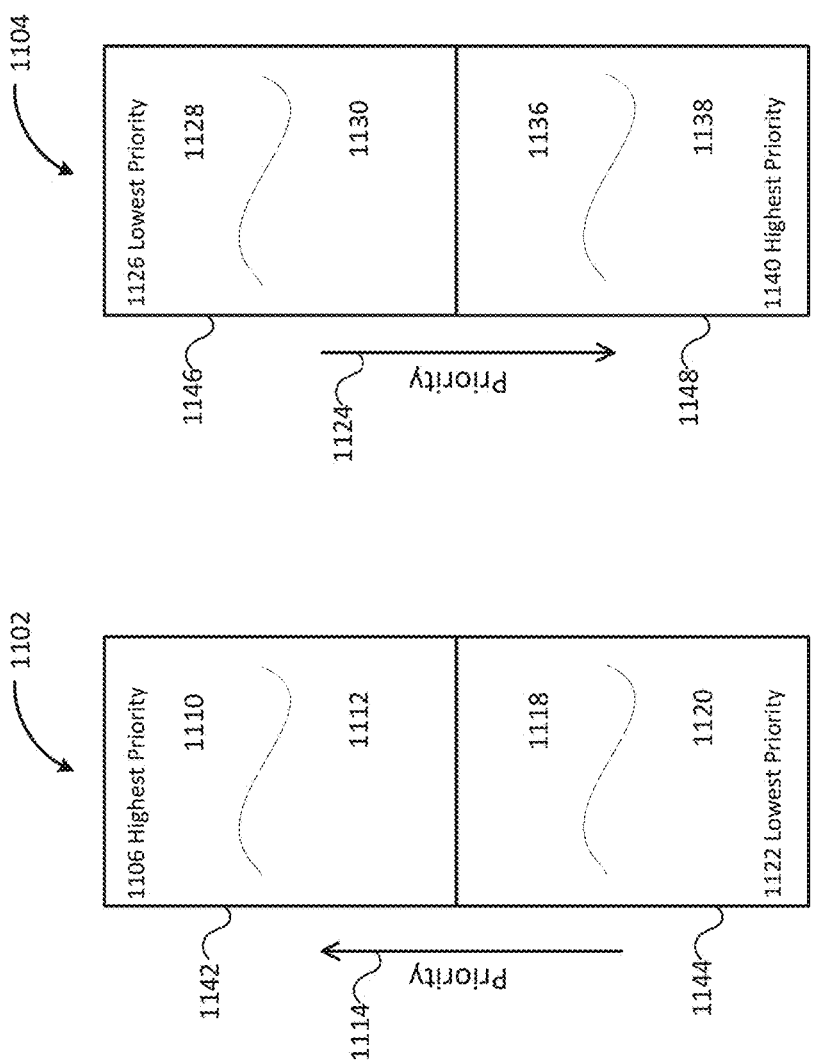
FIG. 11 illustrates exemplary promotion and demotion lists for a wireless communication system incorporating aspects of the disclosed embodiments.

The promotion and demotion lists are generated and sorted 708 as described above. Mobile devices with a target sounding configuration requiring more sounding resources than their current sounding configuration are placed on the promotion list and mobile devices having a target sounding configuration requiring fewer sounding resources than their current configuration are placed on a demotion list. FIG. 11 illustrates an embodiment of a promotion list 1102 and a demotion list 1104 resulting from a sounding resource allocation algorithm 700 based on the three buffer state model 1000 referred to above. Sorting the promotion list 1102 and demotion list 1104 based on the prioritization equation, Equation (1), results in an advantageous structure of the lists 1102, 1104.

The promotion list 1102 is sorted based on the calculated priority as shown by the arrow 1114. As before, the mobile device with the highest priority 1106 is removed for promotion first and the mobile device with the lowest priority 1122 is promoted last. Mobile devices with the largest buffer volumes corresponding to buffer state B3 are at the top 1142 of the promotion list and receive preference for promotion over mobile devices with medium buffer volumes corresponding to buffer state B2 which are located near the bottom 1144 of the promotion list 1102.

Using the reference symbol receive power in the priority calculation, equation (1), mobile devices for promotion are ordered such that mobile devices having large buffer volumes located near the edge of the cell 1110 are promoted first. Mobile devices with large buffer volumes near the cell center 1112 are promoted next followed by promoting mobile devices with medium buffer volumes near the edge of the cell 1118. Mobile devices with medium buffer volumes near the cell center are promoted last.

The demotion list 1104 is sorted as indicated by the arrow 1124 with the lowest priority mobile devices scheduled to be demoted first at the top 1126 of the demotion list 1104 and the highest priority devices at the bottom 1140 of the demotion list 1104. All mobile devices on the demotion list 1104 are in the low buffer volume state B1 however, in certain embodiments it may be advantageous to structure the demotion list 1104 with mobile devices that were previously in the medium buffer state B2 towards the top 1146 of the demotion list 1104 and mobile devices that were previously in the high buffer state B3 toward the bottom 1148 of the demotion list 1104. Including information about the previous device state of a mobile device may be accomplished by using a different priority calculation formula for mobile devices on the demotion list 1104 where the priority calculation used for the demotion list takes a mobile device's previous device state into account.

In certain embodiments it is advantageous to include information about the type of data traffic expected as well as transmit buffer volume. For example, a device state model may include knowledge of the name of applications running on the mobile device, or the quality of service class indicator (CQI), as well as scheduled data volumes. A device state model including information about the traffic type is referred to herein as a traffic state model, or a traffic state.

Figure 12:
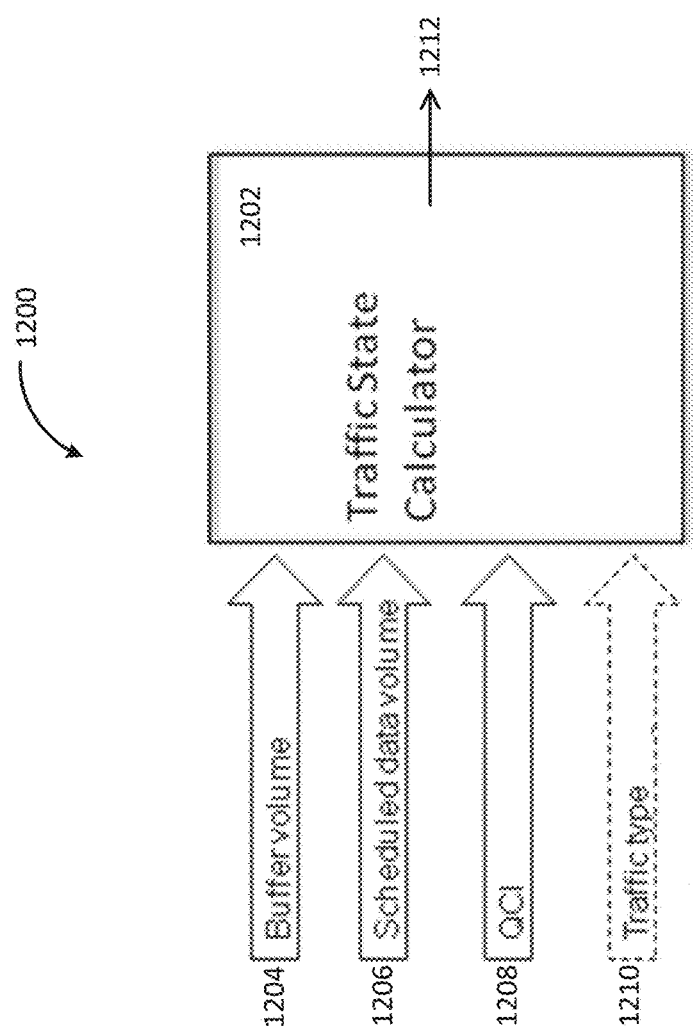
FIG. 12 illustrates an exemplary embodiment of a traffic state calculator for a wireless communication system incorporating aspects of the disclosed embodiments.

A block diagram of an exemplary traffic state calculator 1202 is illustrated by the block diagram 1200 in FIG. 12. Using a traffic state calculator 1202 with knowledge of data traffic type can supplement the buffer volume knowledge to more accurately predict which mobile devices will benefit most from rich sounding. This is especially true for voice traffic. In the buffer state models described above, the target sounding configuration was determined based on information collected during a previous time period, while the determined target sounding configuration will be used by the mobile device during a next time period. It is therefore desirable to enhance the device state model and ultimately the determination of the target sounding configuration with calculations that better predict the conditions that will be present during a next time period.

In the traffic state model 1200 a traffic state calculator is configured to determine a traffic state 1212 based on a number of inputs including the transmit buffer volume of the mobile device 1204, scheduled data volumes for the mobile device 1206, a quality of service class indicator (QCI) 1208, and traffic type 1210. The traffic type may include knowledge of the running application such as voice communication, instant messaging, web posting, stock trading, etc.

Figure 13:
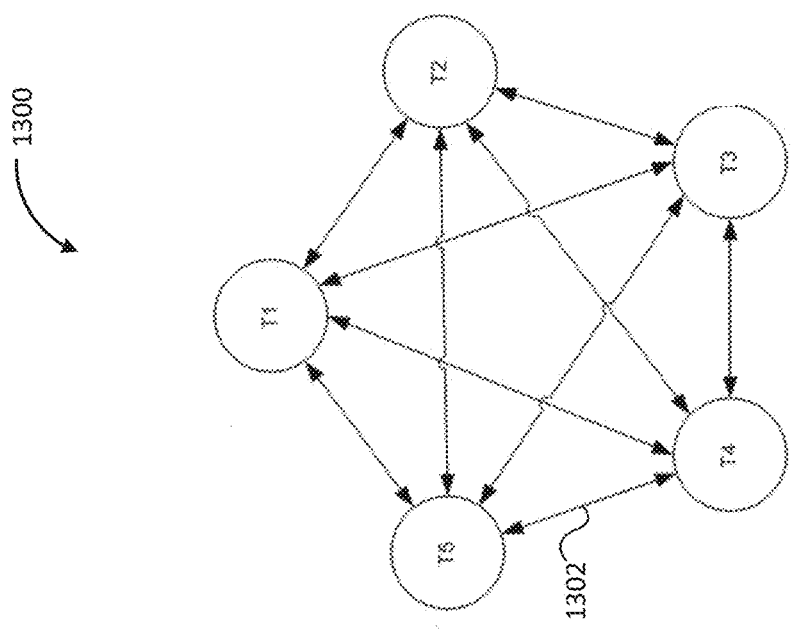
FIG. 13 illustrates a state diagram for an exemplary embodiment of a traffic state model for a wireless communication system incorporating aspects of the disclosed embodiments.

An exemplary embodiment of a traffic state model 1300 is illustrated in FIG. 13 where the exemplary traffic state model includes five traffic states. It should be understood that the five traffic state model is presented only as an aide to understanding and that device state models with more or less than 5 states may be advantageously employed in a sounding resource allocation algorithm 700 without straying from the spirit and scope of the disclosed embodiments. In this example, the traffic states T1, T2, T3, T4, T5, are numbered from one to five where traffic state T1 is assigned to mobile devices having the lightest data traffic and traffic state T5 is assigned to mobile devices having the heaviest data traffic.

Traffic state T1 represents a traffic condition where only occasional, small data packets, are being transmitted by the mobile device, such as data packets that may be handled by one resource block. Traffic state T2 represents a traffic condition where larger occasional data packets, such as data packets requiring several resource blocks, are being transmitted by the mobile device. Traffic state T3 represents a traffic condition where a mobile device is frequently transmitting small packets, such as during a talk spurt in VoIP. Traffic state T4 represents a traffic condition with bursts of large amounts of data, such as data bursts requiring more than about 20 ms to clear the buffer. Traffic state T5 represents a traffic condition with a very large volume of data, such as when the transmit buffer is nearly full. The traffic state model 1300 allows state transitions between any of the five traffic states T1, T2, T3, T4, T5 to any other of the traffic states T1, T2, T3, T4, T5 as indicated by the bi-directional arrows, one of which is indicated by numeral 1302.

A mobile device may be placed in traffic state T1 when it is idle or very inactive. An idle or inactive mobile device may be recognized for example through buffer volume measurements received from the mobile device. If it is known that the mobile device is running a voice application, such as VoIP or VoLTE, then when a talk spurt on the uplink is identified the mobile device may be moved to traffic state T3. The transition from traffic state T1 to traffic state T3 is an example of a traffic state transition that is determined based on both buffer volume and knowledge of the application or traffic type of the mobile device. Traffic state T2 may be determined by measuring the interval between packet bursts, which can be determined by measuring the times during which the transmit buffer is empty, and comparing this interval to an idle threshold such as about 100 ms.

When the idle interval exceeds the idle threshold and the volume per data packet burst is less than a predetermined threshold for maximum packet burst volume, the mobile device may be placed in traffic state T2. Traffic state T4 may be determined similar to traffic state T2 with a larger threshold for the packet burst volume, such as about 50 kilobytes. When it is recognized that the transmit buffer is nearly full or the transmit buffer is occupied for most of a predetermined assessment period, such as about one second, the mobile device may be placed in traffic state T5.

Once the traffic state of a mobile device has been determined a target sounding configuration may be determined for the mobile device based on the traffic state.

TABLE 7

| Traffic State | Target Sounding Configuration | Sounding configuration update period |
|---|---|---|
| T5 | C | 5 |
| T4 | B | 10 |
| T3 | A | 80 |
| T2 | A | 80 |
| T1 | X | Infinite (no sounding) |

Table 7 illustrates an exemplary embodiment of a mapping from the five traffic state model 1300 described above to target sounding configurations as may be advantageously employed in a wireless communication system using four sounding configurations. The richest sounding configuration, C, has a sounding period of 5 ms, the next richest sounding configuration, B, has a sounding period of 10 ms, and the lowest sounding configuration, C, has a sounding period of 80 ms. It is also possible in the wireless communication system illustrated by Table 7 to have some mobile devices with no sounding resources where the sounding configuration using no sounding resourced is denoted as X.

In Table 7, the first column lists the five possible traffic states, T1, T2, T3, T4, T5, the second column lists the corresponding sounding configurations, A, B, C, X, and the third column shows the sounding period for each sounding configuration. Using the mapping shown in Table 7, the target sounding configuration for a mobile device can be determined directly from the device state.

For the purposes of priority calculation, the values of 1 through 5 may be assigned to the traffic states T1 through T5 respectively. A priority formula, such as the priority formula shown in Equation (1), may then be used to determine a priority for each mobile device. It should be noted that basing priority on the downlink reference symbol received power is only one possible way of prioritizing devices. Alternatively, the priority calculation could be based on the distance between a mobile device 150 and the serving access node 100 giving priority to mobile devices 150 that are closer or farther from the serving access node 100, or on a quality of service for which a mobile device has contracted. As noted above, in certain embodiments it is desirable to use different priority formula for the promotion list and the demotion list.

Figure 14:
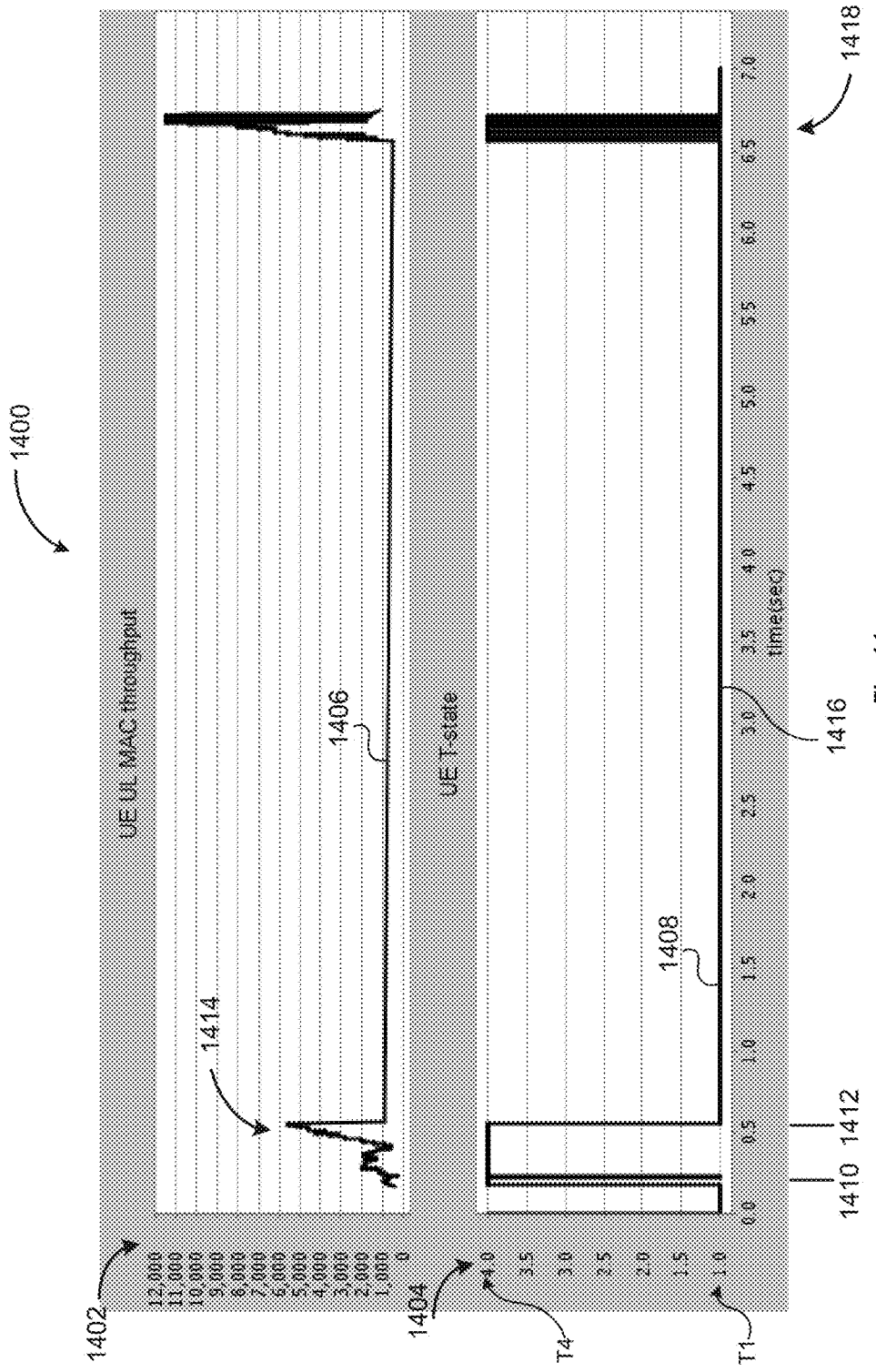
FIG. 14 illustrates a graph showing traffic state transitions and uplink throughput in a wireless communication system incorporating aspects of the disclosed embodiments.

FIG. 14 illustrates a graph 1400 showing traffic state transitions 1408 and uplink throughput 1406 for a mobile device that is uploading large files via a protocol such as file transfer protocol (FTP). The horizontal axis 1416 represents time in seconds. The vertical axis 1402 of the upper graph 1406 represents uplink throughput in bits per second and the vertical axis 1404 of the lower graph 1408 shows the traffic state T1 and T4. The graph 1400 shows how when the uplink throughput increases, such as the point indicated by numeral 1414, the traffic state transitions at the time indicated by numeral 1410 to traffic state T4 and remains in traffic state T4 until the upload completes around the time indicated by numeral 1412.

A second large uplink transmission occurs around the time indicated by numeral 1418 and as can be seen by the state transition graph 1408 the traffic state transitions between traffic state T1 and traffic state T4 until the upload completes. As discussed above, when the traffic state transitions to traffic state T4, the target sounding configuration includes rich sounding to improve uplink throughput performance during the file upload. When the upload completes, the traffic state transitions back to the idle traffic state T1 allowing the mobile device to be demoted to a lower sounding configuration.

In certain embodiments it is advantageous to base the device state model on resource blocks (RB) used by a mobile device. A state model based on resource block usage, referred to herein as an RB-state model, can be based on both the number of resource blocks granted to a mobile device 150 by the access node 100 and how frequently resource blocks are granted. A resource block state of this type can be calculated using the frequency of scheduling events, i.e. the frequency with which an access node 100 grants resource blocks to a mobile device 150, and the number of resource blocks consumed or used by the mobile device 150 during each scheduling event. The RB-state is configured to represent a mobile device need for resource blocks. The resource block state model is more advanced that either the buffer state or traffic state models described above. Rich sounding should be given to mobile devices that can benefit most from the additional sounding resources. A mobile device using a large number of resource blocks may lose the benefits provided by frequency selective scheduling since the bandwidth allocated to the mobile device may exceed the coherence bandwidth of the channel resulting in a frequency diverse allocation. A mobile device using a very small number of resource blocks is only sending small packets of data so the potential benefit provided by rich sounding are small.

State transitions in the RB-state model may be based on current and past measurements, i.e. measurement history, of the frequency of scheduling events and the number of resource blocks consumed using for example statistical traffic classification. The RB-state model assumes channel conditions are relatively stable going forward so that a target sounding configuration determined based on current and past measurements will be valid during the next time period. Alternatively, in certain embodiments it is beneficial to use a predictive algorithm based not only on the frequency and number of resource blocks as described above but also including additional information such as mobile device transmit buffer volume, cell load, modulation and coding scheme, mobile device power headroom, or other values with benefit to the prediction algorithm.

Knowledge of the applications running in the mobile device can also improve device state predictions. For example application knowledge is of significant value in the case of a VoIP application. A predictive state transition algorithm could identify trends in the measurement history and use this to make a more accurate prediction of the state of the mobile device during the next time period.

Figure 15:
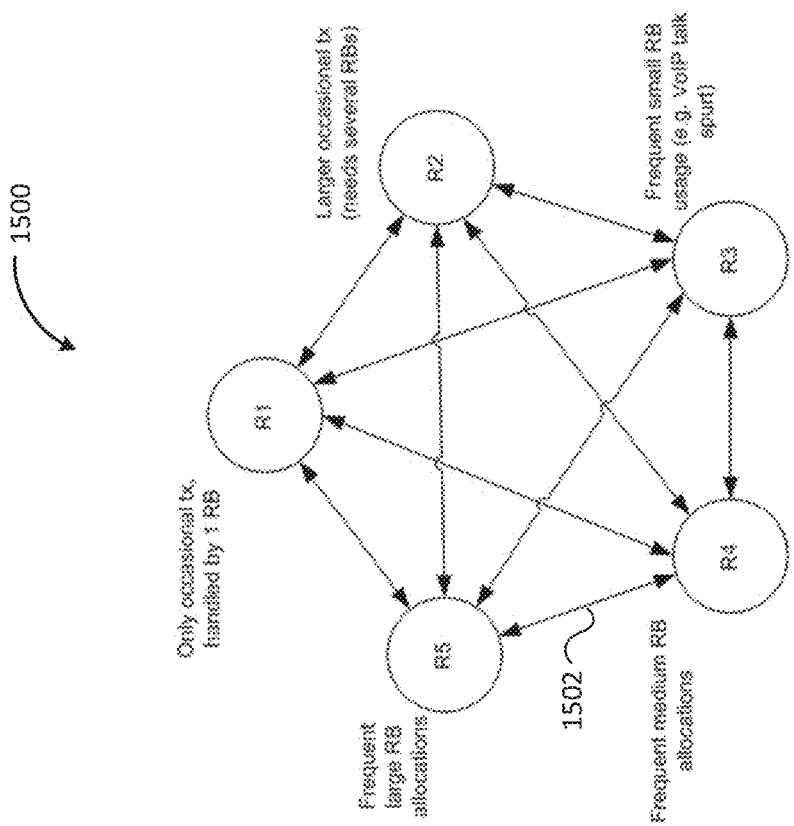
FIG. 15 illustrates an exemplary embodiment of a resource block state model in a wireless communication system incorporating aspects of the disclosed embodiments.

When determining RB-state transitions using a measurement based approach, device state may be determined using simple logic such as described above for the traffic state model 1300. FIG. 15 illustrates an exemplary embodiment of a five RB-state model 1500 that may be used to characterize the state or condition of a mobile device. The exemplary RB-state model 1500 includes five RB-states R1, R2, R3, R4, R5. All state transitions are supported as shown by the transition arrows, where one of the transition arrows is indicated by numeral 1502. In RB-state R1 the mobile device is idle or very nearly idle. An idle mobile device may be determined based on past measurements of resource block usage where a device in RB-state R1 has very infrequent resource block allocations and each resource block allocation is very small such as less than two resource blocks.

When a mobile device is running a VoIP or VoLTE bearer and a talk spurt is identified on the uplink the mobile device is moved to RB-state R3. In this case a combination of resource block quantity and knowledge of the application type is used to determine the RB-state. When knowledge of the executing application is not available, transitions into RB-state R3 may be based on other criteria such as a frequent but low volume scheduling of resource blocks. A RB-state of R3 may be identified as having a mean resource block usage being small or below a predetermined threshold RT1 such as about 4. The variance of resource block usage may also be small or below a predetermined threshold RT2 such as about 16, and mean time between new transmissions, i.e. not counting re-transmissions, is small or below a predetermined threshold RT3 such as about 20 ms. RB-state R4 may be determined in a similar fashion to the determination of RB state R3 with different thresholds such as RT1 about 20 and RT2 about 100. Note the exemplary threshold values given for RT1, RT2, and RT3 are appropriate for a carrier bandwidth of about 10 megahertz (MHz) or about 50 resource blocks. In different wireless communication systems, different threshold values may be advantageously employed.

The RB-state R2 may be determined by measuring the interval between packet bursts, i.e. by measuring the times when the transmit buffer is empty. The measured time interval can then be compared to a predetermined threshold value such as about 100 ms. When the interval exceeds the threshold and the mean resource block allocation per packet burst is lower than a first predetermined threshold, such as about 20 but greater than a second threshold such as about 5, the mobile device would be in RB-state R2. A mobile device would be in RB-state R5 when it receives frequent scheduling of resource blocks, such as about every 20 ms, and the mean resource block consumption for each scheduling event is large such as above about 20.

Figure 16:
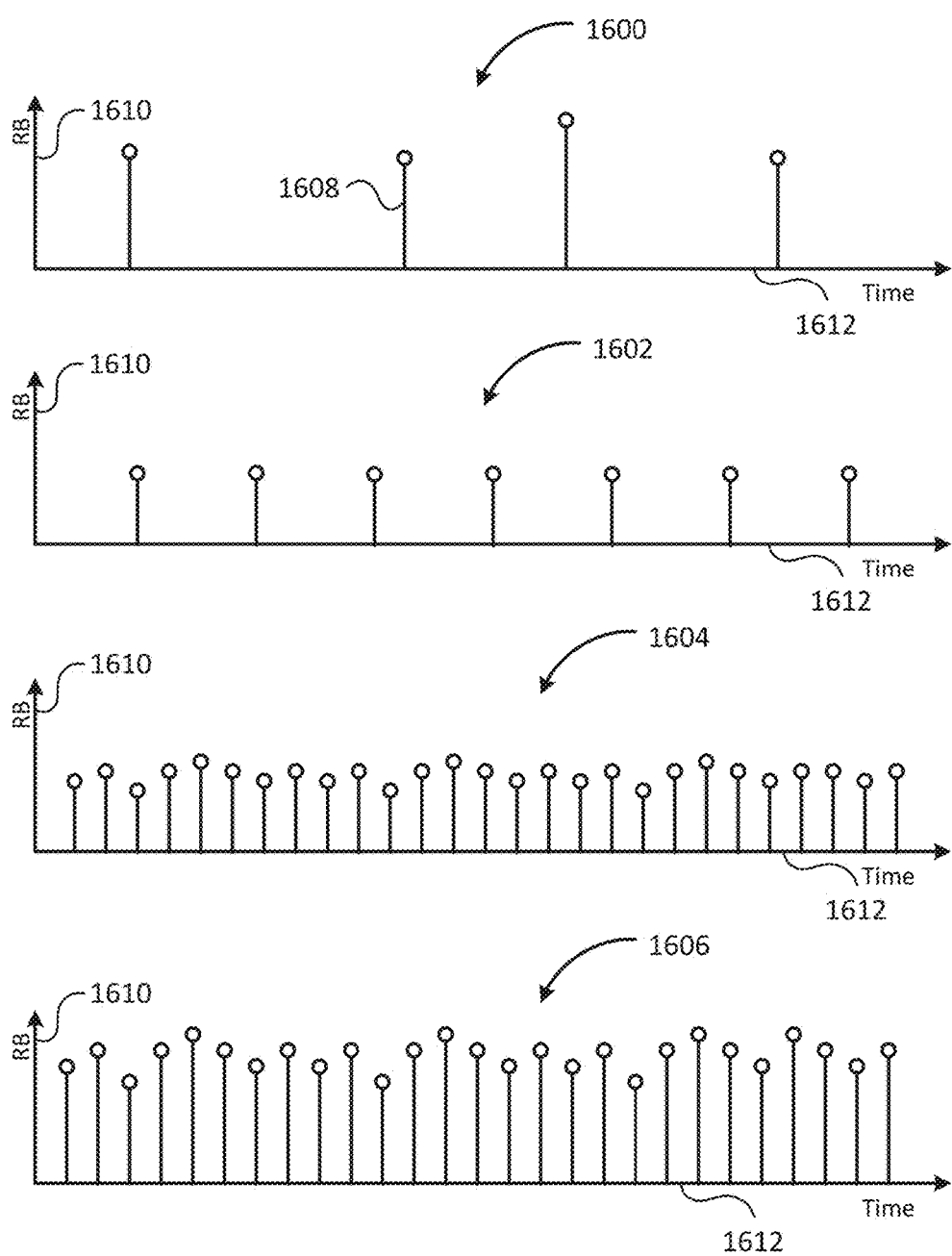
FIG. 16 illustrates exemplary data traffic patterns corresponding to a resource block state model in a wireless communication system incorporating aspects of the disclosed embodiments.

FIG. 16 illustrates exemplary data traffic patterns corresponding to each of the RB-states in the RB-state model 1500 described above. The horizontal axis 1612 in each graph 1600, 1602, 1604, 1606, represents time, and the vertical axis 1610 in each graph 1600, 1602, 1604, 1606 represents a number of resource blocks granted to a mobile device by the servicing access node. Each vertical bar, such as the vertical bar indicated by numeral 1608 represents a scheduling event, which is the time when resource blocks are granted to a mobile device. The height of each bar 1608 represents the number of resource blocks granted to the mobile device during the scheduling event.

RB-state R2 is characterized by larger occasional transmissions requiring several resource blocks each as depicted in the graph 1600. RB-state R3 is characterized by frequent relatively small transmissions such as the traffic generated by an uplink talk spurt in VoIP communications as depicted in graph 1602. RB-State R4 is characterized by frequent transmissions requiring a medium volume of resource blocks each as depicted in graph 1604. RB-State R5 is characterized by frequent large transmissions as depicted by the graph 1606. RB-State R1 is characterized by little or no uplink data transmissions and is not depicted in FIG. 16.

Determination of an appropriate target sounding configuration for each RB-state in the RB-State model 1500 may be achieved using any of the priority formula described herein, such as the mapping from five device states to four sounding configurations shown in Table 7. Determination of target sounding configuration for each device state should strive to give a richer target sounding configuration to mobile devices that have greater throughput requirements or to mobile devices that will benefit most from richer channel sounding.

Determination of priority values for each mobile device when using a resource block state model may be based on a priority formula similar to the priority formula shown in Equation (1) above. For purposes of priority calculation, integer values may be assigned to each RB-State with RB-states requiring higher throughput receiving a greater value as was described above with respect to the traffic state model 1300. Alternatively, real values other than integers may be assigned to device state allowing certain device states to be favored more than others by assigning higher weights to device state that should be promoted first.

In certain embodiments it is desirable to consider multiple features when distinguishing which mobile devices should be promoted or demoted first within a cell. It may also be desirable, as described above with reference to the three buffer state model 1000, to employ different priority formula for the promotion list and the demotion list. For example, a priority formula could include several features such as power headroom as may be obtained from power headroom reports in a LTE type system, resource block allocation statistics collected by an access node while allocating resource blocks to each mobile device, quality of service, as well as other mobile device information.

These features may be incorporated into a priority formula using a weighted sum as shown in Equation (2):

$$P_{md} = \Sigma_i (w_i \text{feature}_i), \quad (2)$$

where $\text{feature}_i$ represents a feature being considered and $w_i$ is a weighting factor used for $\text{feature}_i$. The $\text{feature}_i$ may include for example an average variance or other resource block statistic, transmit buffer size of the mobile device, power headroom etc. For certain features it is sometimes desirable to apply normalization or filtering to the feature value prior to priority computation with Equation (2). The weighting factors $w_i$ may all be configured equal (such as adding up to one) or they may be configured to give greater weight or importance to some features. The weighting for a particular feature may be based on variance of the feature value. For example if a particular feature has a larger variance than another feature being considered in the priority formula, Equation (2), the feature with a larger variance may be given a smaller weight to compensate for the greater variance. In certain embodiments all the features may be normalized in which case applying weights may not be required.

Figure 17:
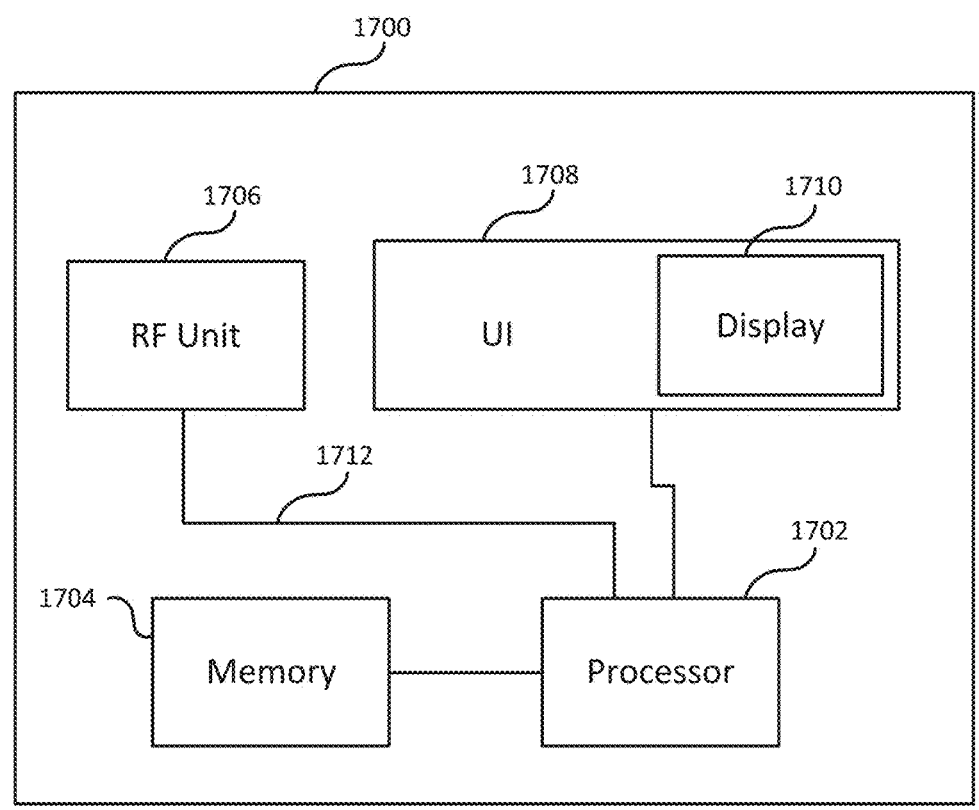
FIG. 17 illustrates a block diagram of an exemplary computing device appropriate for implementing aspects of the disclosed embodiments.

FIG. 17 illustrates a block diagram of an exemplary computing device 1700 appropriate for implementing aspects of the disclosed embodiments. The illustrated computing device 1700 includes a processor 1702 coupled to a computer memory 1704, a network interface 1706, and a user interface (UI) 1708. The computing apparatus 1700 is appropriate for use as a computing device, which in certain embodiments may be a node in a wireless communications system, and is appropriate for implementing any of the methods, such as the exemplary sounding resource allocation algorithm 700 described herein.

The processor 1702 may be a single processing device or may comprise a plurality of processing devices including special purpose devices, such as for example, digital signal processing (DSP) devices, microprocessors, specialized processing devices or general purpose computer processors. The processor 1702 may be configured to implement any of the methods for allocating sounding resources described herein. In certain embodiments the processor may include a CPU working in tandem with a graphics processing unit (GPU) and may include a DSP to handle signal processing tasks. The processor 1702 may also include one or more processing cores configured for parallel processing.

The processor 1702 is coupled 1712 to a memory 1704 which may be a combination of various types of volatile and non-volatile computer memory such as for example read only memory (ROM), random access memory (RAM), magnetic or optical disk, or other types of computer accessible memory. The memory 1704 stores computer program instructions that may be accessed and executed by the processor 1702 to cause the processor to perform a variety of desirable computer implemented processes or methods such as allocation of sounding resources in a wireless network.

The program instructions stored in memory 1704 may be organized as sets or groups of program instructions referred to in the industry with various terms such as programs, software components, software modules, units, etc. Each module may include a set of functionality designed to support a certain purpose. For example a software module may be of a recognized type such as an operating system, an application, a device driver, or other conventionally recognized type of software component. Also included in the memory 1704 are program data and data files which may be stored and processed by the processor 1702 while executing a set of computer program instructions.

In certain embodiments the computing device 1700 includes a network interface 1706 coupled to the processor 1702 and configured to communicate with other processing entities in a wireless communication network. The network interface 1706 may be of a standardized type, such as Ethernet, or may be specific to a particular network implementation. In certain embodiments the network interface 1706 may include a radio frequency unit capable of communicating over a wireless communication network.

The UI 1708 may include one or more user interface elements such as a touch screen, keypad, buttons, voice command processor, as well as other elements adapted for exchanging information with a user. The UI 1708 may also include a display unit 1710 configured to display a variety of information appropriate for a computing device or mobile user equipment and may be implemented using any appropriate display type such as for example organic light emitting diodes (OLED), liquid crystal display (LCD), as well as less complex elements such as LEDs or indicator lamps. In certain embodiments the display unit 1710 incorporates a touch screen for receiving information from the user of the computing device 1700. Alternatively, the computing apparatus may not include a UI 1708 and may be configured to be controlled and administered remotely through the network interface 1706.

Thus, while there have been shown, described and pointed out, fundamental novel features of the disclosure as applied to the exemplary embodiments thereof, it will be understood that various omissions, substitutions and changes in the form and details of devices and methods illustrated, and in their operation, may be made by those skilled in the art without departing from the spirit and scope of the disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A computing apparatus for use in an access node, the computing apparatus comprising:
    processor; and
    a non-transitory computer-readable storage medium coupled to the processor and storing programming instructions which, when executed by the processor, instruct the processor to:
        determine a first device state based on a device state model and first device information, wherein the device state model comprises a finite number of states,
        determine a first target sounding configuration for the first device information based on the first device state,
        output the first target sounding configuration,
        determine a second device state based on the device state model and a second device information,
        determine a second target sounding configuration, wherein the second target sounding configuration comprises fewer sounding resources than a current sounding configuration of the second device information, and
        when available sounding resources for a cell are insufficient to support the first target sounding configuration, output the second target sounding configuration to increase the available sounding resources in the cell.

2. The computing apparatus of claim 1, wherein the programming instructions, when executed by the processor, further instruct the processor to:
    determine the first device state based on an amount of data in a transmit buffer.

3. The computing apparatus of claim 2, wherein the programming instructions, when executed by the processor, further instruct the processor to:
    move the first device state to a higher buffer state when the amount of data in the transmit buffer exceeds a first predetermined threshold for a first predetermined period of time; and
    move the first device state to a lower buffer state when the amount of data in the transmit buffer drops below a second predetermined threshold for a second predetermined period of time.

4. The computing apparatus of claim 1, wherein the programming instructions, when executed by the processor, further instruct the processor to:
    determine the first device state based on an amount of data in the transmit buffer, an amount of data transmitted, and a traffic type.

5. The computing apparatus of claim 1, wherein the programming instructions, when executed by the processor, further instruct the processor to:
    determine the first device state based on:
        a current quantity of resource blocks in the first device information and a past quantity of resource blocks in the first device information, or
        a current frequency of data transmissions in the first device information and a past frequency of data transmissions in the first device information.

6. The computing apparatus of claim 5, wherein the programming instructions, when executed by the processor, further instruct the processor to:
    estimate a device information value for a next time period based on one or more past device information values to generate an estimated device information value; and
    determine a resource block state based on the estimated device information value.

7. The computing apparatus of claim 1, wherein the programming instructions, when executed by the processor, further instruct the processor to:
    determine a first priority for the first device information based on the first device state and the first device information;
    determine a second priority for the second device information based on the second device state and the second device information;
    assign the first device information to a promotion list when a current sounding configuration of the first device information comprises fewer sounding resources than the first target sounding configuration; and
    assign the second device information to a demotion list when the current sounding configuration of the second device information comprises more sounding resources than the second target sounding configuration.

8. The computing apparatus of claim 7, wherein the programming instructions, when executed by the processor, further instruct the processor to:
    determine the first priority for the first device based on at least one of a received signal strength, a power headroom, or a location of a mobile device.

9. The computing apparatus of claim 7, wherein the programming instructions, when executed by the processor, further instruct the processor to:
    determine the first priority of the first device based on at least one of an amount of transmission resources, an uplink channel condition, or a quality of service of the mobile device.

10. The computing apparatus of claim 7, wherein the programming instructions, when executed by the processor, further instruct the processor to:
    remove the first device information from the promotion list when the first priority comprises a highest priority of the promotion list;
    output the first target sounding configuration; and
    when there are insufficient sounding resources available in a cell to support the first target sounding configuration:
        remove the second device information from the demotion list when the second priority comprises a lowest priority of the demotion list, and
        output the second target sounding configuration.

11. The computing apparatus of claim 1, wherein the programming instructions, when executed by the processor, further instruct the processor to:
    initiate the determination of the target sounding configuration based on a timer.

12. The computing apparatus of claim 1, wherein the programming instructions, when executed by the processor, further instruct the processor to:
    initiate the determination of the target sounding configuration based on an event, wherein the event comprises a disconnection of a mobile device from a cell.

13. A method implemented by a computing apparatus for allocating sounding resources, the method comprising:
    determining, by the computing apparatus, a first device state based on a device state model and first device information, wherein the first device state model comprises a finite number of states;
    determining, by the computing apparatus, a first target sounding configuration for the first device information based on the first device state;
    outputting, by the computing apparatus, the first target sounding configuration;
    determining, by the computing apparatus, a second device state based on the device state model and a second device information;
    determining, by the computing apparatus, a second target sounding configuration, wherein the second target sounding configuration comprises fewer sounding resources than a current sounding configuration of the second device information; and
    when available sounding resources for a cell are insufficient to support the first target sounding configuration, outputting, by the computing apparatus, the second target sounding configuration to increase the available sounding resources in the cell.

14. The method of claim 13, further comprising:
    determining, by the computing apparatus, the first device state based on an amount of data in a transmit buffer.

15. The method of claim 13, further comprising:
    determining, by the computing apparatus, the first device state based on an amount of data in the transmit buffer, an amount of data transmitted, and a traffic type.

16. The method of claim 13, further comprising:
    determining, by the computing apparatus, the first device state based on at least one of:
        a current quantity of resource blocks in the first device information and a past quantity of resource blocks in the first device information, or
        a current frequency of data transmission in the first device information and a past frequency of data transmissions in the first device information.

17. The method of claim 16, further comprising:
    estimating, by the computing apparatus, a device information value for a next time period based on one or more past device information values; and
    determining, by the computing apparatus, the resource block state based on the estimated device information value.

* * * * *